(12) United States Patent
Dong

(10) Patent No.: US 12,452,596 B2
(45) Date of Patent: Oct. 21, 2025

(54) METHOD FOR ALLOCATING SPLICED SCREEN AUDIO AND RELATED DEVICE

(71) Applicant: Huawei Technologies Co., Ltd., Shenzhen (CN)

(72) Inventor: Longzhang Dong, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 172 days.

(21) Appl. No.: 18/264,459

(22) PCT Filed: Dec. 16, 2021

(86) PCT No.: PCT/CN2021/138719
§ 371 (c)(1),
(2) Date: Aug. 7, 2023

(87) PCT Pub. No.: WO2022/166428
PCT Pub. Date: Aug. 11, 2022

(65) Prior Publication Data
US 2024/0305928 A1    Sep. 12, 2024

(30) Foreign Application Priority Data
Feb. 8, 2021   (CN) .......................... 202110169814.8

(51) Int. Cl.
*H04R 5/02*   (2006.01)
*G06F 3/14*   (2006.01)
*H04S 7/00*   (2006.01)

(52) U.S. Cl.
CPC ............. *H04R 5/02* (2013.01); *G06F 3/1446* (2013.01); *H04S 7/30* (2013.01); *H04R 2499/15* (2013.01)

(58) Field of Classification Search
CPC ....................................................... H04R 5/02
See application file for complete search history.

(56) References Cited

U.S. PATENT DOCUMENTS

| 2008/0165992 | A1  | 7/2008 | Kondo et al. |
| 2015/0215497 | A1* | 7/2015 | Zhang ................ H04N 21/6336 348/521 |
| 2020/0194016 | A1* | 6/2020 | Zeng ................. H04M 1/72433 |

FOREIGN PATENT DOCUMENTS

| CN | 101151673 A | 3/2008 |
| CN | 106851133 A | 6/2017 |

\* cited by examiner

*Primary Examiner* — Michael H Hong
(74) *Attorney, Agent, or Firm* — Slater Matsil, LLP

(57) ABSTRACT

A host controls a first combined screen, where the first combined screen includes at least two screens that are spliced. A first speaker system is constructed based on video source information of the at least two screens. The first speaker system includes a speaker of a first screen and a speaker of a second screen. In addition, corresponding channel types are allocated to the speakers included in the first speaker system based on screen parameters of the at least two screens. The channel types include a left channel, a center channel, and a right channel.

20 Claims, 19 Drawing Sheets

| Screen a | Screen b |
|---|---|
| Screen c | Screen d |

FIG. 6

| Screen number | A |
|---|---|
| Master screen information | Master |
| Relative location | Master |
| Video source information | Video source 1 |
| Speaker information | A1-left and A2-right |
| Other parameters | Display size |

FIG. 7

METHOD FOR ALLOCATING SPLICED SCREEN AUDIO AND RELATED DEVICE

This application is a national stage of International Application No. PCT/CN2021/138719, filed on Dec. 16, 2021, which claims priority to Chinese Patent Application No. 202110169814.8 filed on Feb. 8, 2021. Both of the aforementioned applications are hereby incorporated by reference in their entireties.

TECHNICAL FIELD

This application relates to the field of communication technologies, and in particular, to a method for allocating spliced screen audio and a related device.

BACKGROUND

With the rapid development of wireless technologies and the popularization of splitting technologies, major manufacturers gradually launch split televisions, that is, televisions for which hosts are separated from screens. In this way, one-host multi-screen may be implemented. Based on this, a user may combine a plurality of screens into a spliced screen of a larger display size, so that the user experiences a larger and better visual effect. The spliced screen of a large size may better support display of different content in a split-screen manner, so that the user watches different programs at the same time.

When a conventional spliced screen performs playing, to ensure consistency of audio play, a host is usually externally connected to an audio device such as a sound box in a wired manner, to play audio. When the screen itself has a speaker device, this manner of externally connecting to an audio device obviously cannot make good use of the speaker of the screen, causing a waste of speaker resources. However, if the speaker of the screen is directly used to play audio, speakers of different screens cause interference during playing, resulting in a poor play effect and poor user experience.

SUMMARY

This application provides a method for allocating spliced screen audio. A speaker system may be constructed by effectively using a speaker of each screen in a spliced screen, to play audio data in a stereophonic manner.

According to a first aspect, an embodiment of this application provides a method for allocating spliced screen audio, applied to a host, where the host is configured to control a first combined screen, the first combined screen includes at least two screens that are spliced, and the at least two screens include a first screen and a second screen;
obtaining screen parameters of the at least two screens, where the screen parameters include relative locations of the at least two screens and speaker information of the at least two screens, and the speaker information includes a quantity and locations of speakers;
obtaining video source information of the at least two screens, where the video source information includes a first video source corresponding to the first screen and the second screen, and the first video source includes corresponding first audio data;
constructing a first speaker system based on the video source information, where the first speaker system includes a speaker of the first screen and a speaker of the second screen; and
allocating corresponding channel types to the speakers in the first speaker system based on the screen parameters, where the channel types include a left channel, a center channel, and a right channel.

In this way, the first speaker system may be constructed by using the speaker on each screen in the first combined screen, and a stereophonic play mode is formed by adding the center channel, so that the first combined screen can play audio data in a stereophonic manner, thereby improving a play effect.

In an implementation, the at least two screens further include a third screen, and the video source information further includes a second video source that the third screen corresponds to; and
before the constructing a first speaker system based on the video source information, the method further includes:
determining whether the first video source and the second video source are a same video source; and
if the first video source and the second video source are a same video source, the constructing a first speaker system based on the video source information includes:
constructing the first speaker system based on the video source information, where the first speaker system includes the speaker of the first screen, the speaker of the second screen, and a speaker of the third screen.

In this way, when the screens in the first combined screen correspond to a same video source, it indicates that the screens play a same piece of audio data. Therefore, the first speaker system may be jointly formed by using the speakers of the screens, to play audio data in a stereophonic manner.

In an implementation, the at least two screens further include a third screen, and the video source information further includes a second video source that the third screen corresponds to;
before the constructing a first speaker system based on the video source information, the method further includes:
determining whether the first video source and the second video source are a same video source;
if the first video source and the second video source are different video sources, determining whether the second video source includes audio data; and
if the second video source carries the audio data, obtaining a first indication of a user; and
the constructing a first speaker system based on the video source information includes:
constructing the first speaker system based on the first indication and the video source information.

In this way, when the screens in the first combined screen correspond to different video sources, to prevent mutual interference between played audio data, the first indication may be sent to select to play a piece of audio data, and the first speaker system is formed by using the screens corresponding to the audio data, so that stereo of the audio data is played by using the first speaker system.

In an implementation, the first indication indicates to play the audio data carried in the first video source, or indicates to play the first audio data; and
the constructing a first speaker system based on the video source information includes:
constructing the first speaker system by using the speaker of the first screen and the speaker of the second screen based on the first indication and the video source information.

In this way, to-be-played audio data may be selected in a plurality of manners.

In an implementation, the at least two screens further include a third screen, and the video source information further includes a second video source that the third screen corresponds to; and
   before the constructing a first speaker system based on the video source information, the method further includes:
   determining whether the first video source and the second video source are a same video source;
   if the first video source and the second video source are different video sources, determining whether the second video source carries audio data; and
   if the second video source has no audio data,
   the constructing a first speaker system based on the video source information includes:
   constructing the first speaker system based on the video source information, where the first speaker system includes the speaker of the first screen, the speaker of the second screen, and a speaker of the third screen.

In this way, the first speaker system may be constructed by using the speaker corresponding to the screen corresponding to the video source that has no audio data, to play stereo of the audio data by using the first speaker system.

In an implementation, the at least two screens further include a third screen and a fourth screen, the video source information further includes a second video source that the third screen corresponds to and a third video source that the fourth screen corresponds to;
   before the constructing a first speaker system based on the video source information, the method further includes:
   determining whether the first video source, the second video source, and the third video source are a same video source;
   if the first video source, the second video source, and the third video source correspond to at least two video sources, determining whether the second video source and the third video source carry audio data; and
   if the second video source or the third video source carries audio data, obtaining a second indication of a user; and
   the constructing a first speaker system based on the video source information includes:
      constructing a first speaker system based on the second indication, the video source information, and a preset rule.

In this way, when at least two video sources carry the audio data, the first speaker system may be formed by selecting the speakers of the screens corresponding to to-be-played audio data. In addition, the first speaker system may further include a speaker of a screen that has no audio data.

In an implementation, the preset rule includes that the speakers in the first speaker system are symmetrically disposed.

In this way, auditory-visual effects are ensured by ensuring that the speakers of the first speaker system are symmetrically disposed.

In an implementation, the allocating corresponding channel types to the speakers in the first speaker system based on the screen parameters includes:
   allocating a left channel to a speaker on a left side of a second combined screen, allocating a center channel to a speaker in a middle of the second combined screen, and allocating a right channel to a speaker on a right side of the second combined screen, where the second combined screen includes the screens corresponding to the speakers in the first speaker system.

The center channel is allocated to the speaker in the first speaker system, to form the speaker system that can play stereo.

In an implementation, the speaker information further includes speaker numbers, and after the allocating corresponding channel types to the speakers in the first speaker system based on the screen parameters, the method further includes:
   generating a channel allocation instruction based on an allocation result of the channel types, where the channel allocation instruction includes a correspondence between the allocation result of the channel types and the speaker numbers.

In an implementation, after the allocating corresponding channel types to the speakers in the first speaker system based on the screen parameters, the method further includes:
   constructing a first receiving group by using the screens corresponding to the speakers in the first speaker system, where the first receiving group has a first multicast address; and
   sending audio data and an allocation result of the channel types to the first multicast address.

In this way, the audio data and the channel allocation instruction may be distributed to the screens corresponding to the speakers in the first speaker system in a multicast manner.

In an implementation, the method further includes:
   allocating video data to the screens in the first combined screen based on the video source information and the relative locations of the at least two screens; and
   generating a picture allocation instruction based on an allocation result of the video data, where the picture allocation instruction includes a correspondence between the screens and the video data.

In this way, the video data may be displayed in a splicing manner by using the first combined screen, to obtain a picture with a larger size.

In an implementation, the method further includes:
   constructing a second receiving group by using screens corresponding to a same video source, where the second receiving group has a second multicast address; and
   sending the video data and the picture allocation instruction to the second multicast address.

In this way, the video data and the picture allocation instruction may be distributed to the screens corresponding to the same video source in a multicast manner.

According to a second aspect, an embodiment of this application further provides a system, where the system includes a host and a first combined screen, the host is configured to control the first combined screen, the first combined screen includes at least two screens that are spliced, and the at least two screens include a first screen and a second screen;
   the host obtains screen parameters of the at least two screens, where the screen parameters include relative locations of the at least two screens and speaker information of the at least two screens, and the speaker information includes a quantity and locations of speakers;
   the host obtains video source information of the at least two screens, where the video source information includes a first video source corresponding to the first screen and the second screen, and the first video source includes corresponding first audio data;
   the host constructs a first speaker system based on the video source information, where the first speaker system includes a speaker of the first screen and a speaker of the second screen;

the host sends a channel allocation instruction to the first screen and the second screen based on the screen parameters, where the channel allocation instruction is used to allocate corresponding channel types to the speakers in the first speaker system, and the channel types include a left channel, a center channel, and a right channel; and the first screen and the second screen extract, according to the channel allocation instruction, corresponding audio data from the first audio data for playing at the corresponding speakers.

In an implementation, that the first screen and the second screen extract, according to the channel allocation instruction, corresponding audio data from the first audio data for playing at the corresponding speakers includes:

the first screen and the second screen extract corresponding channel types from the channel allocation instructions based on speaker numbers;

the first screen and the second screen extract the audio data from the first audio data based on the channel types; and the first screen and the second screen distribute the audio data to the corresponding speakers for playing.

In an implementation, the method further includes:

the host is further configured to allocate video data to the screens in the first combined screen based on the video source information and the relative locations of the at least two screens;

the host generates a picture allocation instruction based on an allocation result of the video data, where the picture allocation instruction includes a correspondence between the screens and the video data; and the host sends the video data and the picture allocation instruction to the first screen and the second screen.

In an implementation, the method further includes:

the first screen and the second screen extract corresponding pictures from the picture allocation instruction and the video data based on the screen parameters; and the first screen and the second screen play the corresponding pictures.

According to a third aspect, this application further provides an electronic device, including a memory and a processor. The memory is coupled to the processor. The memory is configured to store computer program code/instructions, and when the processor executes the computer program code/instructions, the electronic device is enabled to perform the method in the first aspect and the implementations of the first aspect.

According to a fourth aspect, this application further provides a computer storage medium. This computer storage medium stores computer instructions. When the computer instructions are run on a storage device, the storage device is enabled to perform the method in the first aspect and the implementations of the first aspect.

According to a fifth aspect, this application further provides a computer program product including instructions. When the computer program product is run on a computer, the computer is enabled to perform the method in the first aspect and the implementations of the first aspect.

According to a sixth aspect, this application further provides a chip system. The chip system includes a processor, configured to support the foregoing apparatus or device in implementing functions in the first aspect and the implementations of the first aspect.

BRIEF DESCRIPTION OF THE DRAWINGS

To describe the technical solutions in this application more clearly, the following briefly describes the accompanying drawings that need to be used in embodiments. Apparently, those of ordinary skill in the art may still derive other drawings from these accompanying drawings without creative efforts.

FIG. 6 is a schematic diagram of a structure of relative locations of screens according to an embodiment of this application;

FIG. 7 is a list of device parameters of a screen A according to an embodiment of this application;

DESCRIPTIONS OF REFERENCE NUMERALS

1—host, 101—screen management module, 102—play management module, 103—audio management module, 104—audio and video distribution module, 105—control module, 110—communication module, 120—another input device, 130—memory, 140—processor, 150—power supply, 160—display screen, 170—sensor, 2—screen, 20—spliced screen, 201—video receiving module, 202—video processing module, 203—audio receiving module, 204—audio processing module, 205—first speaker, 206—second speaker, 01—left channel, 02—right channel, 03—center channel, 001—memory, and 002—processor.

DETAILED DESCRIPTION OF ILLUSTRATIVE EMBODIMENTS

The following clearly and completely describes the technical solutions in embodiments of the present invention with reference to the accompanying drawings in embodiments of the present invention. Apparently, the described embodiments are merely some rather than all of embodiments of the present invention. Based on the embodiments of the present invention, all other embodiments obtained by those of ordinary skill in the art without creative effort fall within the protection scope of the present invention.

Figure 1:
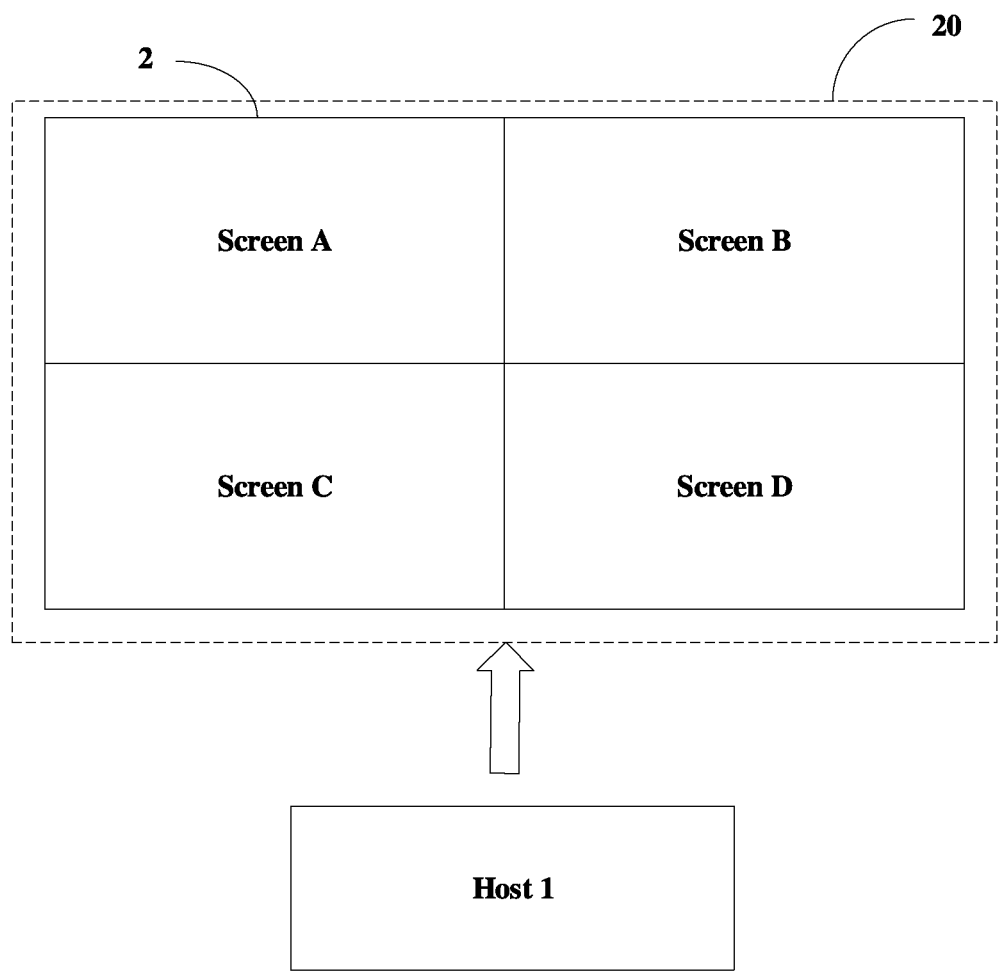
FIG. 1 is a schematic diagram of control between a host and a plurality of screens according to an embodiment of this application.

As people's requirements for video watching experience gradually increase, people increasingly pursue a large-sized screen. Because the size of an entire large-sized screen is relatively large, it is difficult to manufacture the screen, and spot defects easily occur. Therefore, the cost of using the entire large-sized screen is relatively high, and it is difficult to control quality. With the rapid development of wireless technologies and the popularization of splitting technologies, major manufacturers gradually launch split televisions, that is, televisions in which hosts are separated from screens. In this way, one-host multi-screen may be implemented. This also provides a basis for implementing a large-sized screen through splicing. That is, a plurality of independent screens may be spliced together to obtain a large-sized spliced screen. FIG. 1 is a schematic diagram of control between a host and a plurality of screens according to an embodiment of this application. As shown in FIG. 1, a host 1 may simultaneously control a plurality of screens 2. For example, the host 1 simultaneously controls a screen A, a screen B, a screen C, and a screen D. The host 1 separately transmits video data and audio data that need to be played to the screen A, the screen B, the screen C, and the screen D, to display the corresponding audio and video data by collaboration between the screen A, the screen B, the screen C, and the screen D, so as to achieve an effect of displaying the audio data by using stereo. In addition, a large-sized spliced screen 20 formed by the screen A, the screen B, the screen C, and the screen D is used to display the video data, so that a user can experience a larger and better visual effect and a more stereoscopic auditory effect.

In order to achieve the display effect of the spliced screen 20, structures of the host 1 and the screens 2 are specifically as follows:

The host 1 may be an independent device, or may be integrated on the screens 2, or may be integrated into a device such as a mobile phone, a computer, a tablet computer, a server, or a cloud platform.

Figure 2:
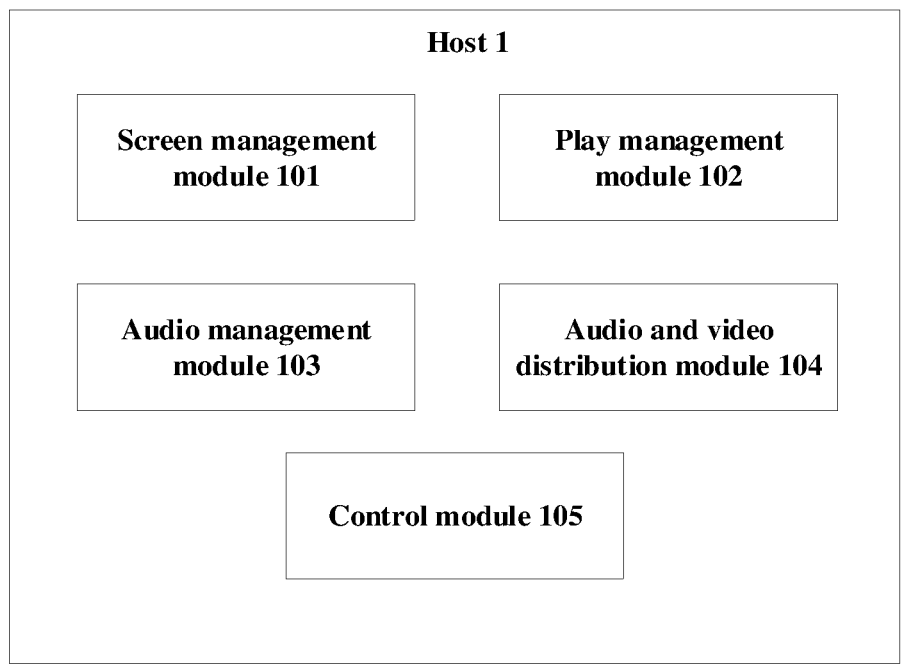
FIG. 2 is a schematic diagram of a structure of a host according to an embodiment of this application.

FIG. 2 is a schematic diagram of a structure of a host according to an embodiment of this application. As shown in FIG. 2, the host 1 includes at least a screen management module 101, a play management module 102, an audio management module 103, an audio and video distribution module 104, and a control module 105. The screen management module 101, the play management module 102, the audio management module 103, the audio and video distribution module 104, and the control module 105 are coupled to each other.

The screen management module 101 is configured to store device parameters of each screen 2, for example, data such as a screen number, a relative location, and a speaker number. The play management module 102 is configured to allocate corresponding video data to each screen 2 with reference to to-be-displayed video data, the device parameters of each screen 2 that are stored in the screen management module 101, and a user requirement, to display one or more complete pictures on the spliced screen 20. The audio management module 103 is configured to allocate corresponding audio data to a speaker of each screen 2 with reference to to-be-played audio data, the device parameters of each screen 2 that are stored in the screen management module 101, and a user requirement, to form interference-free audio and stereo. The audio and video distribution module 104 is configured to: receive the video data and a picture allocation instruction that are generated by the play management module 102 and the audio data and a channel allocation instruction that are generated by the audio management module 103, and distribute the corresponding video data, picture allocation instruction, audio data, and channel allocation instruction to each screen. The control module 105 is configured to: receive requirement instructions sent by a user, for example, an input instruction and a selection instruction, and transfer the requirement instructions to the screen management module 101, the play management module 102, and the audio management module 103, so that the screen management module 101 stores the device parameters of each screen 2, and the play management module 102 and the audio management module 103 may set a proper video and audio display manner based on a user requirement.

Figure 3:
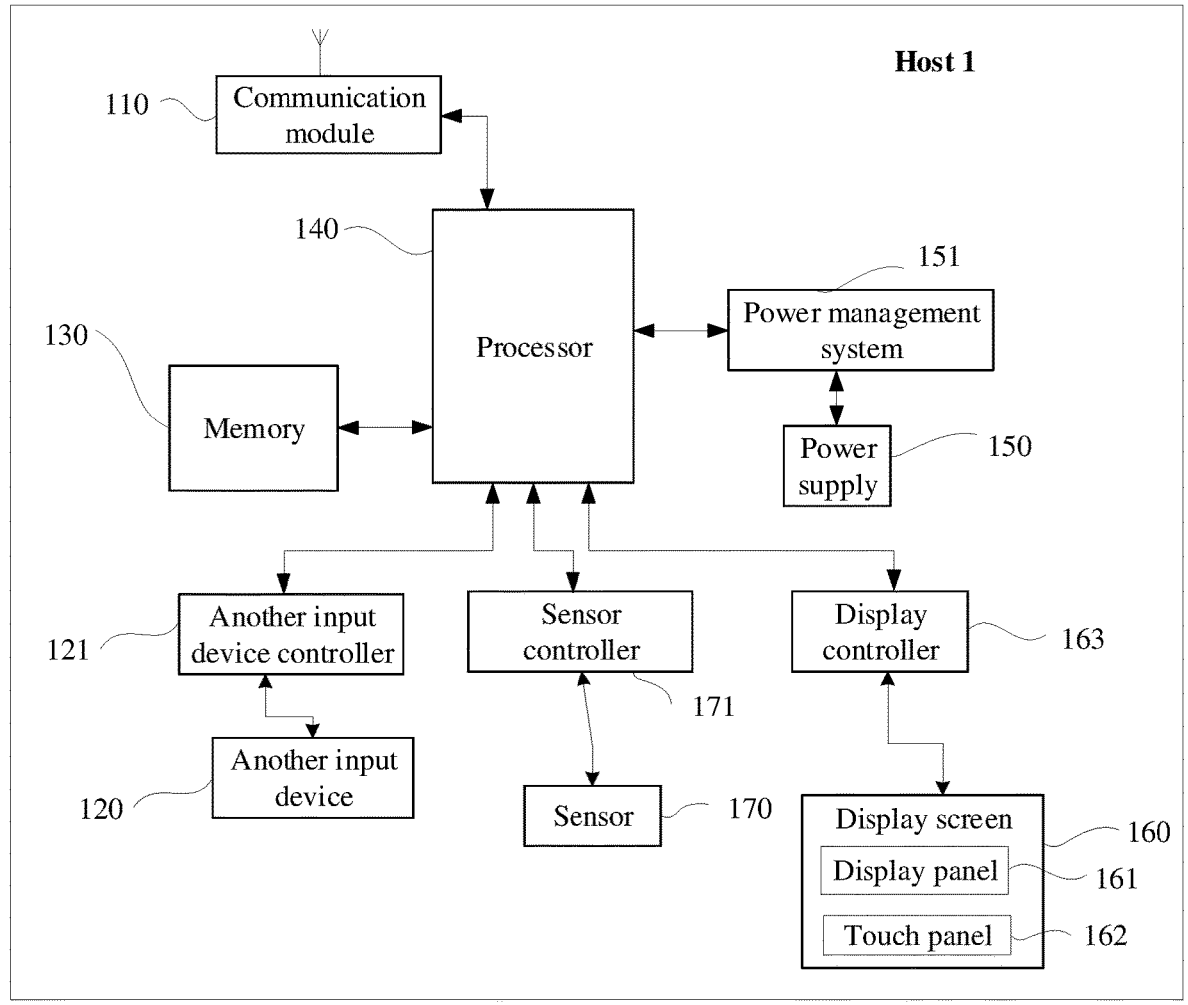
FIG. 3 is a schematic diagram of a hardware structure of an electronic device according to an embodiment of this application.

Functions of the foregoing modules may be implemented by hardware in the host 1. As shown in FIG. 3, FIG. 3 provides a schematic diagram of a hardware structure of an electronic device. The electronic device may be a structure of the host 1 or the screen 2. The electronic device includes components such as a communication module 110, another input device 120, a memory 130, a processor 140, and a power supply 150. The host 1 may further include components such as a display screen 160 and a sensor 170.

The power supply 150 is used to supply power to each component of the electronic device. The memory 130 is configured to store software programs and modules. The processor 140 may execute various functional applications and data processing of the electronic device by running the software programs and the modules stored in the memory 130. The communication module 110 and the another input device 120 are configured to receive video data, audio data, an instruction, information and an instruction that are entered by a user, and the like. The display screen 160 may be configured to display information entered by a user or information provided for the user, and various menus of the electronic device, and may further work with the sensor 170 to receive a user input. The processor 140 processes the video data and the audio data based on the instruction, and the information and the instruction that are entered by the user, for example, generates the picture allocation instruction and the audio allocation instruction, or extracts the corresponding audio and video data from the video data and the audio data.

In some embodiments, a function of the communication module 110 may be implemented by using a radio frequency (Radio Frequency) circuit. The RF circuit includes but is not limited to an antenna, at least one amplifier, a transceiver, a coupler, a duplexer, and the like. In addition, the RF circuit may further communicate with a network and another device through wireless communication. The wireless communication may use any communication standard or protocol, including but not limited to: global system for mobile communications (Global System for Mobile Communications, GSM), a general packet radio service (General Packet Radio Service, GPRS), code division multiple access (Code Division Multiple Access, CDMA), wideband code division multiple access (Wideband Code Division Multiple Access, WCDMA), long term evolution (Long Term Evolution, LTE), an email, a short messaging service (Short Messaging Service, SMS), and the like. The another input device 120 may be configured to: receive input numeric or character information, and generate a key signal input related to user settings and function control of the electronic device. Specifically, the another input device 120 may include but is not limited to one or more of a physical keyboard, a functional key (for example, an OK key or a direction key), a trackball, a mouse, a joystick, an optical mouse (the optical mouse is a touch-sensitive surface that does not display a visual output, or is an extension of a touch-sensitive surface that includes a touchscreen), and the like. Signal interaction is performed with the processor 140 under control of another device input controller 121.

The memory 130 may be configured to store software programs and modules. The processor 140 executes various functional applications and data processing of the electronic device by running the software programs and the modules stored in the memory 130. The memory 130 may mainly include a program storage area and a data storage area. The program storage area may store an operating system, an application required by at least one function, and the like. The data storage area may store data (such as a video source, an audio source, and device parameters of the screen 2) created based on use of the screen 2, and the like. In addition, the memory 130 may include one or more storage units for implementation. The storage unit may include, for example, a volatile memory (volatile memory), such as a dynamic random access memory (dynamic random access memory, DRAM), or a static random access memory (static random access memory, SRAM); and may further include a non-volatile memory (non-volatile memory, NVM), such as a read-only memory (read-only memory, ROM), or a flash memory (flash memory). Different storage units may be independent components, or may be integrated or packaged together.

The processor 140 is a control center of the electronic device. The processor 140 is connected to all parts of the entire electronic device by using various interfaces and lines, and performs various functions and data processing of the electronic device by running or executing the software programs and/or the modules stored in the memory 130 and invoking data stored in the memory 130, to perform overall control on the electronic device. Optionally, the processor 140 may include one or more processing units, for example, a system on a chip (system on a chip, SoC), a central processing unit (central processing unit, CPU), a microcontroller (microcontroller, MCU), and a storage controller. Different processing units may be independent components, or may be integrated into one or more processors.

The power supply 150 may be configured to supply power to each component, and may be a battery. Preferably, the power supply 150 may be logically connected to the processor 140 by using a power management system 151, to implement functions such as management of charging, discharging, and power consumption by using the power management system 151.

The display screen 160 may be configured to display information entered by a user or information provided for the user, and various menus of the electronic device, and may further receive a user input. Specifically, the display screen 160 may include a display panel 161 and a touch panel 162. The display panel 161 may be configured in a form of a liquid crystal display (Liquid Crystal Display, LCD), an organic light-emitting diode (Organic Light-Emitting Diode, OLED), or the like. The touch panel 162 may also be referred to as a touchscreen, a touch-sensitive screen, or the like, and may collect a contact or non-contact operation of the user on or near the touch panel 162, and drive a corresponding connection apparatus according to a preset program. The touch panel 162 may cover the display panel 161, and the user may perform a corresponding operation on the touch panel 162 based on content displayed on the display panel 161. The display screen 160 is connected to the processor 140 by using a display controller 163, to control display content of the display screen 160 by using the display controller 163. In a case, if the host 1 is integrated on the screen 2, the display screen 160 is a display screen of the screen 2.

The sensor 170 may be an optical sensor, a motion sensor, or another sensor. The sensor 170 is connected to the controller 140 by using the sensor controller 171, and the sensor 170 exchanges a signal with the processor 140 under control of the sensor controller 171.

Although not shown, the electronic device may further include a camera, a Bluetooth module, an NFC circuit, and the like, and details are not described herein.

Figure 4:
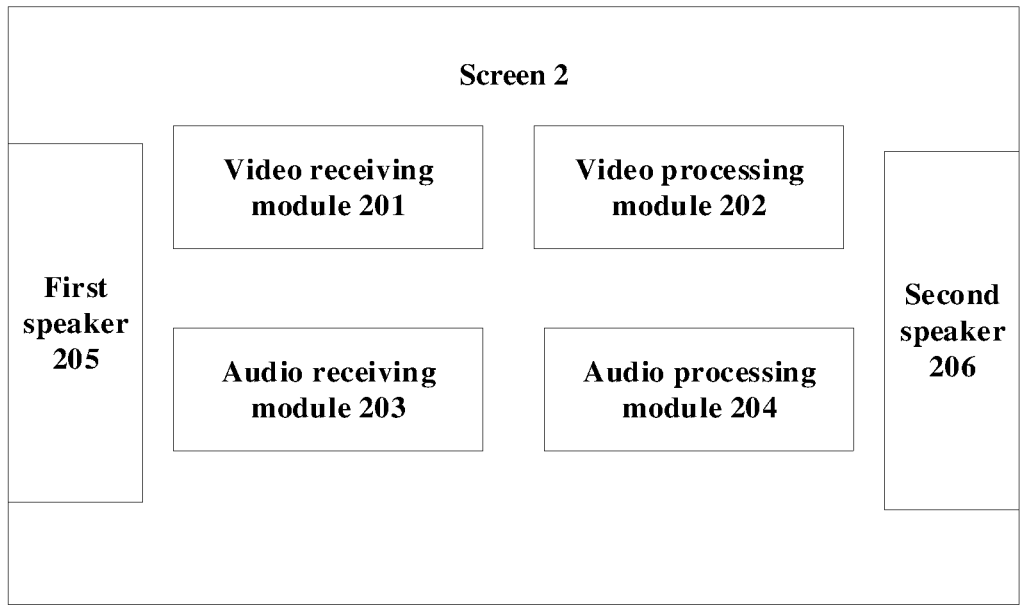
FIG. 4 is a schematic diagram of a structure of a screen according to an embodiment of this application.

FIG. 4 is a schematic diagram of a structure of a screen according to an embodiment of this application. The screen 2 is a screen in the spliced screen 20. As shown in FIG. 4, the screen 2 includes a video receiving module 201, a video processing module 202, an audio receiving module 203, an audio processing module 204, a first speaker 205, and a second speaker 206. The video receiving module 201, the video processing module 202, the audio receiving module 203, the audio processing module 204, the first speaker 205, and the second speaker 206 are coupled to each other, the first speaker 205 is a left speaker of the screen 2, and the second speaker 206 is a right speaker of the screen 2.

The video receiving module 201 is configured to: receive video data and a picture allocation instruction that are sent by the host 1, and transmit the video data and the picture allocation instruction to the video processing module 202. The video processing module 202 splits the video data according to the picture allocation instruction to obtain corresponding video data and displays the video data. The audio receiving module 203 is configured to: receive audio data and a channel allocation instruction that are sent by the host 1, and transmit the audio data and the channel allocation instruction to the audio processing module 204. The audio processing module 204 splits the audio data according to the channel allocation instruction to obtain audio data to be played on the first speaker 205 and the second speaker 206, and transmits the audio data obtained through splitting to the corresponding first speaker 205 and second speaker 206.

In some embodiments, functions of the video receiving module 201 and the audio receiving module 203 may be implemented by using a receiver, for example, an RF circuit, and functions of the video processing module 202 and the audio processing module 204 may be implemented by using a processor. The screen 2 may further include a memory, configured to store computer instructions, so that the video processing module 202 and the audio processing module 204 process video data and audio data by using the computer instructions. For specific structures of the processor and the memory in the screen 2, refer to the descriptions of the processor and the memory in the electronic device in FIG. 3. Details are not described herein again.

To obtain a better video display effect, the screen 2 may use a display screen with a relatively narrow bezel, for example, a full screen. In this way, when a plurality of screens 2 are spliced together to display a same picture in a form of the spliced screen 20, impact of a splicing location on a video display effect may be alleviated.

Specifically, the following several embodiments illustrate video data and audio data allocation solutions corresponding to different audio and video display effects:

Embodiment 1

For a case in which a same picture is displayed in a splicing manner by the screens 2 in the spliced screen 20, usually, to obtain a larger display picture, so as to achieve a more shocking visual effect, the user may splice the plurality of screens 2 together to display a same picture, for example, a large screen, a movie screen, or an electronic billboard on a concert site. Because a same picture is displayed in a splicing manner by the spliced screen 20, audio data played on each screen 2 should correspond to the picture, and there is no interference between each other. Therefore, a speaker system may be constructed by using speakers of all the screens 2 in the spliced screen 20, and a different channel type is allocated to each speaker in the speaker system, to achieve an effect of playing the audio data in a stereophonic manner.

Figure 5:
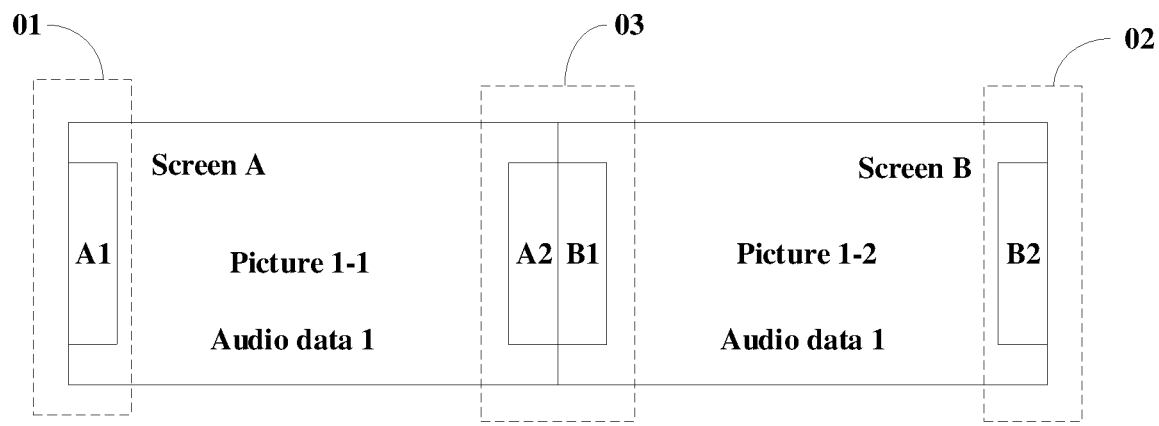
FIG. 5 is a schematic diagram of displaying a same picture in a splicing manner by screens in a spliced screen according to an embodiment of this application.

FIG. 5 is a schematic diagram of displaying a same picture in a splicing manner by screens in a spliced screen according to an embodiment of this application. As shown in FIG. 5, the spliced screen 20 includes a screen A and a screen B, and both the screen A and the screen B are controlled by the host 1.

In some embodiments, before controlling the screen A and the screen B to display the audio and video data, the host 1 may pre-store device parameters of the screen A and the screen B into the screen management module 101, to serve as a basis for allocating the audio and video data to the screen A and the screen B. The screen A is used as an example for description. Details are as follows:

The device parameters of the screen A include video source information, master screen information, a screen number, a relative location of the screen, and speaker information.

The video source information includes a binding relationship between the screen 2 and a video source. For example, if the screen A is bound to a video source 1, it indicates that the screen A is used to play the video source 1. If video sources bound to the screen A and the screen B are the same, for example, both are the video source 1, it indicates that the screen A and the screen B play a same picture in a splicing manner. Using the spliced screen provided in FIG. 5 as an example, if the screen A plays a part N1 in a picture 1, and the screen B plays a part N2 in the picture 1, pictures 1-N1 and 1-N2 are spliced into a complete picture 1. If the video sources bound to the screen A and the screen B are different, it indicates that the two screens play different pictures, and the screens are merely physically spliced together.

Master screen information of the screen A includes whether the screen A is a master screen (isMaster). The master screen is a screen that may be used as a reference standard in the spliced screen, for example, a location reference or a reference for playing audio and video data. The master screen may be defaulted by the host 1, or may be specified by a user.

A screen number (indexNo) of the screen A may be customized as 1, A, or the like, or may be a device ID of the screen A, for example, a MAC address or PIN code of the screen A.

For a relative location (location) of the screen A, after the master screen is determined, two-dimensional coordinate information of the screen A, that is, location information of the screen A relative to the master screen, may be determined by using the master screen as an origin. For example, if the screen A is the master screen, the relative location of the screen A is the master screen; or if the screen B is the master screen, the relative location of the screen A is a left side of the master screen, and may be represented by a left screen number (leftIndexNo) of the master screen. Usually, relative locations of other screens are different based on different determined master screens. FIG. 6 is a schematic diagram of a structure of relative locations of screens according to an embodiment of this application. If a screen a at a central location is used as a master screen, a relative location of a screen b is a right side of the master screen, and may be represented by a right screen number (rightIndexNo) of the master screen, a relative location of a screen c is below the master screen, and may be represented by a down screen number (downIndexNo) of the master screen, and a relative location of a screen d is a lower right side of the master screen, and may be represented by a right-down screen number (right-downIndexNo) of the master screen. If the screen b is used as the master screen, a relative location of the screen a is a left side of the master screen, and may be represented by a left screen number (leftIndexNo) of the master screen, a relative location of the screen c is a lower left side of the master screen, and may be represented by a left down screen number (left-downIndexNo) of the master screen, and a relative location of the screen d is below the master screen, and may be represented by a down screen number (downIndexNo) of the master screen.

Speaker information of the screen A includes a binding relationship between a speaker number of each speaker on the screen A and a channel type. The speaker number is used to identify each speaker on the screen A, and each speaker on the spliced screen 20 may correspond to a different speaker number. In this way, the speaker number is uniquely identified. For example, speaker information of a left speaker on the screen A is A1, speaker information of a right speaker on the screen A is A2, speaker information of a left speaker on the screen B is B1, and speaker information of a right speaker on the screen B is B2. The speaker number may also refer to a binding relationship between the number of the speaker and the screen. For example, the number of the left speaker of the screen A is 1, and the speaker is bound to the screen A, and may be represented by A-1; and the number of the right speaker of the screen A is 2, and the speaker is bound to the screen A, and may be represented by A-2. Channel types of the screen A include a left channel (left channel) and a right channel (right channel). The speaker located on the left side of the screen A corresponds to the left channel, and the speaker located on the right side of the screen B corresponds to the right channel, so as to establish a binding relationship between the speaker number and the channel type. For example, the speaker A1 located on the left side of the screen A corresponds to the left channel, and may be represented by Left-A1. The speaker A2 located on the right side of the screen A corresponds to the right channel, and may be represented by Right-A2.

The device parameters of the screen A may further include other parameters, for example, screen information (such as a display size) of the screen A. Details are not described herein.

For the device parameters of the screen B, refer to the device parameters of the screen A. To facilitate management of device parameters, a list of device parameters of the screen 2 may be generated and stored into the memory. FIG. 7 is a list of device parameters of a screen A according to an embodiment of this application, so that the device parameters of the screen A can be clearly and orderly managed. Each screen in the spliced screen 20 has a list of independent device parameters corresponding to the screen (for a list form, refer to FIG. 7), or device parameters of all screens in the spliced screen 20 may be summarized to generate a list.

In some embodiments, the foregoing device parameters may be obtained in a manner of manual input or automatic obtaining by the host 1 based on an actual requirement.

For example, in an implementation, the device parameters of the screen A and the screen B may be manually entered. The user manually enters the screen numbers of the screen A and the screen B, and manually ticks a master screen. After the master screen is determined, a relative location of the other screen is manually entered based on the master screen.

In another implementation, after being connected to the screen A and the screen B, the host 1 obtains the device parameters of the screen A and the screen B through data transmission between the screen A and the screen B, and the host 1, for example, video source information, master screen information, screen numbers, relative locations of the screens, speaker information, and channel information corresponding to the speakers. The screen A and the screen B may be communicatively connected to the host 1 by using a Wi-Fi network, Bluetooth, or NFC. The host 1 may request the device parameter from the screen A and the screen B in the foregoing connection manner, or receive, in the foregoing connection manner, the device parameters actively sent by the screen A and the screen B.

In another implementation, the host 1 may obtain the device parameters of the screen A and the screen B by code scanning. For example, the screen A and the screen B have identification code, and the host 1 may obtain the device parameters corresponding to the screen A and the screen B by scanning the identification code.

After obtaining the device parameters of the screens 2, the host 1 may also send these device parameters to each screen 2, so that each screen 2 stores the device parameters of all screens 2.

After the device parameters of the screen A and the screen B are pre-stored in the screen management module 101, the play management module 102 and the audio management module 103 may allocate audio and video data based on the device parameters. A specific manner is as follows:

Using FIG. 5 as an example, the screen A and the screen B form the spliced screen 20. The host 1 stores the device parameters of the screen A and the screen B, including the screen numbers A and B of the screen A and the screen B, the video source information of the screen A and the screen B (the screen A is bound to the video source 1, and the screen B is bound to the video source 1), the master screen A, the screen B is located on the right side of the master screen A, the speaker information (A1-left and A2-right) of the screen A, and the speaker information (B1-left and B2-right) of the screen B. For example, A1, A2, B1, and B2 are unique identifiers of the speakers.

Figure 8:
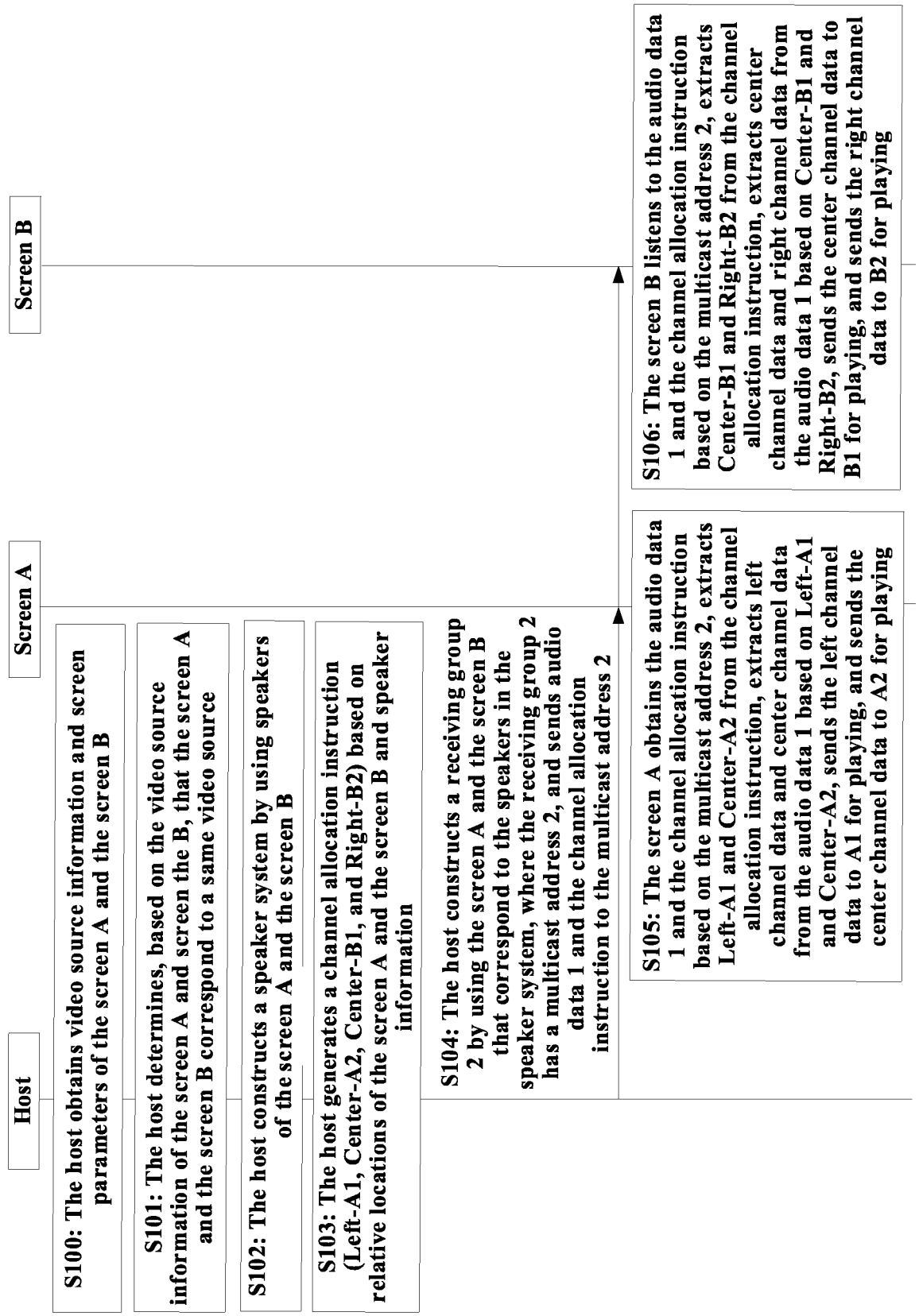
FIG. 8 is a flowchart of a method for allocating channels of a spliced screen according to an embodiment of this application.

FIG. 8 is a flowchart of a method for allocating channels of a plurality of screens according to an embodiment of this application. As shown in FIG. 8, the method includes the following steps.

S100: The host obtains the video source information and the screen parameters of the screen A and the screen B.

The host 1 receives video data on a network side and obtains the pre-stored screen parameters of the screen A and the screen B by using the communication module 110. The screen parameters include relative locations of the screen A and the screen B (the screen A is the master screen, and the screen B is located on the right side of the screen A) and the speaker information. The speaker information includes a quantity and locations of speakers (the screen A includes the speaker A1 and the speaker A2, where the speaker A1 is located on the left side of the screen A, and the speaker A2 is located on the right side of screen A; and the screen B includes the speaker B1 and the speaker B2, where the speaker B1 is located on the left side of the screen B, and the speaker B2 is located on the right side of the screen B). The screen parameters may further include screen numbers. For example, the screen number of the screen A is A, and the screen number of the screen B is B. The speaker information may further include speaker numbers. For example, the speaker number of the speaker A1 is A1.

S101: The host determines, based on the video source information of the screen A and screen the B, that the screen A and the screen B correspond to a same video source.

The host 1 first determines whether the screen A and the screen B correspond to a same video source. In this embodiment, the play management module 102 determines, based on the video source information of the screen A and the screen B (the screen A corresponds to the video source 1, and the screen B corresponds to the video source 1), that the screen A and the screen B correspond to the same video source, that is, the screen A and the screen B play same audio data in a splicing manner. The audio data is audio data 1 from the video source 1. Therefore, both the screen A and the screen B play the audio data 1.

S102: The host constructs a speaker system by using the speakers of the screen A and the screen B.

S103: The host generates a channel allocation instruction (Left-A1, Center-A2, Center-B1, and Right-B2) based on the relative locations of the screen A and the screen B and the speaker information.

In S100, locations of the speakers on the corresponding screens may be directly obtained, and then relative locations of the speakers on the spliced screen 20 are determined based on the relative locations of the screens. Using the speaker B2 as an example, the speaker B2 is located on the right side of the screen B, and the screen B is located on the right side of the screen A. It can be learned that the screen B is located on the right side of the spliced screen 20, and therefore, it may be determined that the speaker B2 is located on the right side of the spliced screen 20.

In some embodiments, the speaker information of the screen A includes a correspondence (Left-A1 and Right-A2) between a speaker number of each speaker on the screen A and a channel type, the speaker information of the screen B includes a correspondence (Left-B1 and Right-B2) between a speaker number of each speaker on the screen B and a channel type, and the channel allocation instruction includes Left-A1, Center-A2, Center-B1, and Right-B2.

S1031: The audio management module determines a relative location of each speaker in the speaker system on a corresponding screen based on the speaker information of the screen A and the screen B, and further determines a relative location of each speaker on the spliced screen based on the relative locations of the screen A and the screen B.

For example, as shown in FIG. 5, it can be learned based on the speaker information of the screen A that, A1 corresponds to the left channel of the screen A and is located on the left side of the screen A, and A2 corresponds to the right channel of the screen A and is located on the right side of the screen A. Similarly, it can be learned based on the speaker information of the screen B that, B1 is located on the left side of the screen B and B2 is located on the right side of the screen B. Further, based on the relative locations of the screen A and the screen B, it can be learned that A1 is located on the left side of the spliced screen 20, A2 and B1 are located in the middle of the spliced screen 20, and B2 is located on the right side of the spliced screen 20. It can be learned that, the speakers in the speaker system are distributed in three regions on the spliced screen 20. Compared with that the screen A or the screen B includes only speakers located in left and right regions of the screen, a speaker located in the middle region of the screen is added to the speaker system, and each region corresponds to one channel type. Therefore, the speaker system may play audio 1 by using three channels, that is, the left channel, the right channel, and the center channel. In this way, a 2.1 sound box is formed. In addition to audio data of the left channel and the right channel, the left ear and the right ear of the user can perceive different audio data, and heavy bass audio data can also be reflected by using the center channel, so as to achieve an effect of enriching audio layers.

S1032: The audio management module reallocates a corresponding channel type to each speaker based on a relative location of each speaker on the spliced screen 20.

In this embodiment of this application, the audio management module 103 allocates the left channel to the speaker (A1) located on the left side of the spliced screen 20, allocates the center channel to the speakers (A2 and B1) located in the middle of the spliced screen 20, and allocates the right channel to the speaker (B2) located on the right side of the spliced screen 20, and generates a channel allocation instruction accordingly. The channel allocation instruction may adopt a parameter structure including a channel type and a speaker number, for example, the left channel "Left-A1", the center channels "Center-A2" and "Center-B1", and the right channel "Right-B2". In this case, the channel allocation instruction is Left-A1, Center-A2, Center-B1, and Right-B2.

It can be learned that, in this embodiment, a channel allocation policy is that, if the spliced screen 20 plays a same video source, the speaker located on the left side of the spliced screen 20 corresponds to the left channel, the speaker located on the right side of the spliced screen 20 corresponds to the right channel, and the speakers located in the middle of the spliced screen 20 correspond to the center channel.

S104: The host constructs a receiving group 2 by using the screen A and the screen B that correspond to the speakers in the speaker system, where the receiving group 2 has a multicast address 2, and sends the audio data 1 and the channel allocation instruction to the multicast address 2.

In this embodiment, the audio and video distribution module 104 divides the screens corresponding to the speakers located in the speaker system into a same receiving group, where the speaker system includes the speakers A1, A2, B1, and B2, and corresponds to the screen A and the screen B. Therefore, the screen A and the screen B are divided into a same receiving group, for example, the receiving group 2, where the receiving group 2 is used to receive data related to audio information. If the audio and video distribution module 104 sends data to the receiving group 2 in a multicast manner, a multicast address, for example, the multicast address 2, needs to be allocated to the receiving group 2, and the multicast address 2 is sent to the screen A and the screen B in a unicast manner. In this way, the audio and video distribution module 104 may send the audio data 1 and the channel allocation instruction to the multicast address 2, so that the screen A and the screen B in the receiving group 2 listen to the audio data 1 and the channel allocation instruction based on the multicast address 2, to obtain the audio data 1 and the channel allocation instruction.

In an implementation, the audio and video distribution module 104 first sends the channel allocation instruction (Left-A1, Center-A2, Center-B1, and Right-B2) to the multicast address 2, and then sends the audio data 1 to the multicast address 2. In this way, the screen A and the screen B may extract corresponding audio data from the audio data 1 based on the previously received channel allocation instruction and send the audio data to the corresponding speakers for playing.

In another implementation, S104 may be replaced as follows: The audio and video distribution module 104 sends a same message including a data packet that corresponds to a channel allocation instruction. For example, the message may include (a data packet 1, Left-A1, Center-A2, Center-B1, and Right-B2), where the audio data 1 (the audio 1) includes a plurality of data packets. In this way, each time the screen A and the screen B receive a data packet, corresponding audio data may be extracted from the data packet according to the channel allocation instruction received together and allocated to the corresponding speaker for playing.

In this manner of distributing data in a multicast manner, one distribution action may enable a plurality of terminals to complete receiving, to improve data distribution efficiency. In addition, because distributed data is the same, consistency of the audio data, the video data, the picture allocation instruction, and the channel allocation instruction that are received by the screens 2 can be ensured. Especially for the screens 2 that display a same picture in a splicing manner and for the screens 2 that play same audio data, synchronization between the screens 2 can be effectively ensured, thereby ensuring a display effect.

S105: The screen A obtains the audio data 1 and the channel allocation instruction based on the multicast address 2, determines the corresponding channel allocation instruction Left-A1 and Center-A2 based on the screen number A, further extracts left channel data and center channel data from the audio data 1 based on Left-A1 and Center-A2, sends the left channel data to A1 for playing, and sends the center channel data to A2 for playing.

The audio receiving module 203 of the screen A listens to the audio data 1, Left-A1, Center-A2, Center-B1, and Right-B2 based on the multicast address 2, and delivers the obtained audio data 1 to the audio processing module 204 for processing. The audio processing module 204 determines the corresponding channel allocation instruction, that is, Left-A1 and Center-A2, based on the screen number. The audio processing module 204 determines, based on Left-A1 and Center-A2, that A1 corresponds to the left channel and A2 corresponds to the center channel. The audio processing module 204 extracts the left channel data and the center channel data from the audio data 1 based on Left-A1 and Center-A2, allocates the left channel data to A1, and allocates the center channel data to A2 for playing.

S106: The screen B listens to the audio data 1 and the channel allocation instruction based on the multicast address 2, determines the corresponding channel allocation instruction Center-B1 and Right-B2 based on the screen number B, further extracts the center channel data and the right channel data from the audio data 1 based on Center-B1 and Right-B2, sends the center channel data to B1 for playing, and sends the right channel data to B2 for playing.

The screen B processes the audio data 1 in a manner as described for the screen A, and displays the audio data 1, so as to achieve an effect of playing stereo. It can be learned that, in this embodiment, the screen A and the screen B no longer play audio data by using their respective speaker systems as units. Instead, the two speaker systems are combined together to construct a speaker system with a center channel, so as to achieve an effect of playing stereo, thereby improving audio play quality and improving auditory experience of the user.

Figure 9:
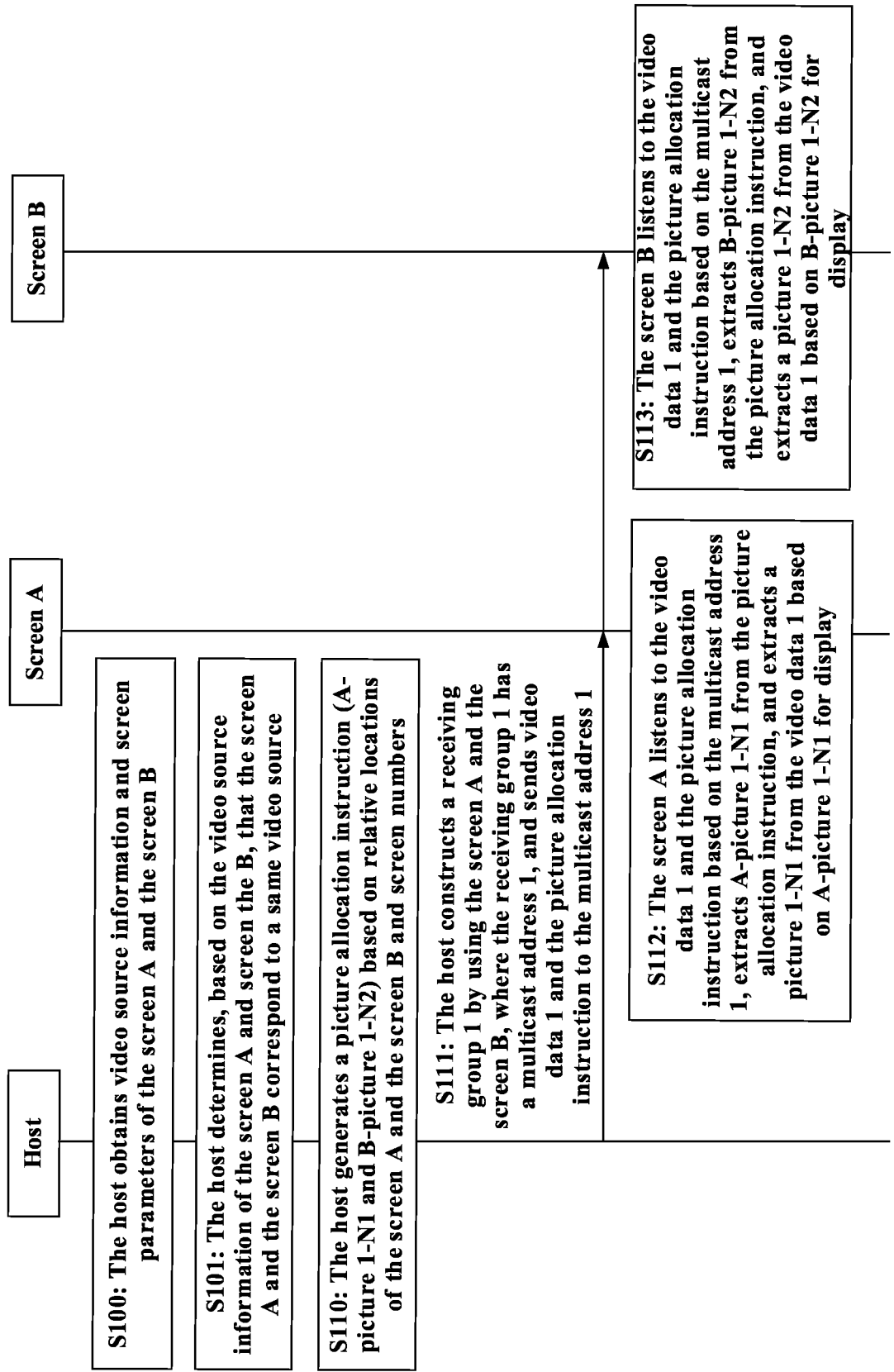
FIG. 9 is a flowchart of a method for allocating pictures of a spliced screen according to an embodiment of this application.

The screen A and the screen B may display video data in a splicing manner based on a procedure shown in FIG. 9. FIG. 9 is a schematic flowchart of a picture allocation method according to an embodiment of this application. After it is determined in S100 that the screen A and the screen B correspond to the same video source (the video source 1), it may be determined that the screen A and the screen B play same video data (video data 1). In this case, the video data 1 may be allocated to the screen A and the screen B based on the procedure shown in FIG. 9. Details are as follows:

S110: The host generates a picture allocation instruction (A-picture 1-N1 and B-picture 1-N2) based on the relative locations of the screen A and the screen B and the screen numbers.

The play management module 102 determines, based on the relative locations of the screen A and the screen B (the screen A is the master screen, and the screen B is located on the right side of the master screen A), a left picture N1 of each frame of picture (represented by a picture 1 below) in the video data 1 played on the screen A, and a right picture N2 of the picture 1 played on the screen B. Therefore, the play management module 102 may establish a correspondence between the pictures N1 and N2 in the picture 1 and the screen numbers A and B. For example, if a picture identifier corresponding to the partial picture located on the left side of the picture 1 is the picture 1-N1, and a picture identifier corresponding to the partial picture located on the right side of the picture 1 is the picture 1-N2, the picture allocation instruction is obtained based on the correspondence between each partial picture in the picture 1 and the screen number, for example, A-picture 1-N1 or B-picture 1-N2.

The play management module 102 may divide the picture 1 by using the following method, to obtain the picture N1 and the picture N2:

The play management module 102 calculates a picture display ratio based on display sizes of the screen A and the screen B. For example, the play management module 102 obtains the display sizes of the screen A and the screen B from the device parameters based on the screen numbers of the screen A and the screen B. In this way, the picture display ratio of the screen A to the screen B may be obtained by calculating a display width ratio of the screen A to the screen B. For example, the picture display ratio is 1:1, indicating that the screen A and the screen B evenly share the picture 1. In this case, the play management module 102 may divide the picture 1 based on the picture display ratio, that is, determine a left picture of the evenly divided picture 1 as the picture N1, determine a right picture of the picture 1 as the picture N2, and it may be negotiated that N1 indicates a picture display ratio of the picture N1 in the picture 1, and N2 indicates a picture display ratio of the picture N2 in the picture 2. In another implementation, it may be directly negotiated that N1 indicates a relative location of the picture N1 in the picture 1, for example, the picture N1 is located on the left side of the picture 1, and it may be negotiated that N2 indicates a relative location of the picture N2 in the picture 1, for example, the picture N2 is located on the right side of the picture 1.

S111: The host constructs a receiving group 1 by using the screen A and the screen B, where the receiving group 1 has a multicast address 1, and sends the video data 1 and the picture allocation instruction to the multicast address 1.

The audio and video distribution module 104 transmits packets to the screen A and the screen B in a multicast manner. The audio and video distribution module 104 sends a same packet (video data and audio data) to a plurality of receivers (a plurality of screens) in a same group by using a multicast technology. The audio and video distribution module 104 first sends the video data to the multicast address, and each screen in the receiving group listens to the video data based on the multicast address.

The play management module 102 divides screens bound to a same video source into a same receiving group, that is, divides the screen A and the screen B into a same receiving group, for example, the receiving group 1, where the receiving group 1 is used to receive data related to video information. If the audio and video distribution module 104 sends data to the receiving group 1 in a multicast manner, a multicast address, for example, the multicast address 1, needs to be allocated to the receiving group 1, and the multicast address 1 is sent to the screen A and the screen B in a unicast manner. In this way, the audio and video distribution module 104 may send the video data 1 and the picture allocation instruction to the multicast address 1, so that the receiving group 1 listens to the video data 1 and the picture allocation instruction based on the multicast address 1, to obtain the video data 1 and the picture allocation instruction.

In an implementation, the audio and video distribution module 104 may first send the picture allocation instruction (A-picture 1-1 and B-picture 1-2) to the multicast address 1, and then send the video data 1 to the multicast address 1. In this way, the screen A and the screen B may extract corresponding picture data from the video data 1 based on the previously received picture allocation instruction for playing.

In another implementation, S111 may be replaced as follows: The audio and video distribution module 104 sends each frame of picture data and a corresponding picture allocation instruction by using a same message. For example, the message may include (a first frame of picture data of the picture 1, A-picture 1-N1, and B-picture 1-N2), and the video data 1 (the picture 1) includes a plurality of frames of picture data. In this way, each time the screen A and the screen B receive a frame of picture data, corresponding picture data may be extracted from the picture data according to the picture allocation instruction received together and played.

In this manner of distributing data in a multicast manner, one distribution action may enable a plurality of terminals to complete receiving, to improve data distribution efficiency. In addition, because distributed data is the same, consistency of the audio data, the video data, the picture allocation instruction, and the channel allocation instruction that are received by the screens 2 can be ensured. Especially for the screens 2 that display a same picture in a splicing manner and for the screens 2 that play same audio data, synchronization between the screens 2 can be effectively ensured, thereby ensuring a display effect.

S112: The screen A listens to the video data 1 and the picture allocation instruction based on the multicast address 1, determines the corresponding picture allocation instruction A-picture 1-N1 based on the screen number A, and further extracts the picture 1-N1 from the video data 1 based on A-picture 1-N1 for display.

The video receiving module 201 of the screen A listens to the video data 1 and the picture allocation instruction (A-picture 1-N1 and B-picture 1-N2) based on the multicast address 1, and delivers the obtained video data 1 to the video processing module 202 for processing, to obtain a picture complying with the picture allocation instruction.

The video processing module 202 of the screen A obtains the video data 1 and the picture allocation instruction (A-picture 1-N1 and B-picture 1-N2). In this embodiment, the video processing module 202 may determine a corresponding allocation instruction, that is, A-picture 1-N1, from the picture allocation instruction based on the screen number A. This indicates that the picture to be displayed is the picture 1-N1. If N1 indicates the picture display ratio of the picture N1 in the picture 1, the video processing module 202 may obtain the saved relative location of the screen A from the screen A, and parse the video data 1 based on the relative location of the screen A and the picture display ratio to obtain the picture 1-N1. If N1 indicates the relative location of the picture N1 in the picture 1, the video processing module 202 may directly extract a picture corresponding to the relative location from the picture 1, to obtain the picture N1. Further, the video processing module 202 further zooms in the picture 1-N1, so that the picture 1-N1 can adapt to the display size of the screen A. The video processing module 202 further performs time alignment processing on the picture 1-N1, to ensure synchronous playing of the picture 1-N1 and the picture 1-N2. The video processing module 202 may further include other processing functions for improving video play quality, which are not described one by one herein.

S113: The screen B listens to the video data 1 and the picture allocation instruction based on the multicast address 1, determines a corresponding picture allocation instruction B-picture 1-N2 based on the screen number B, and further extracts the picture 1-N2 from the video data 1 based on B-picture 1-N2 for display.

The screen B processes and displays the video data 1 in the foregoing manner, to achieve an effect of displaying the picture 1 by splicing with the screen A, thereby improving visual experience of the user.

For a picture allocation principle of the spliced screen 20 in the following embodiments, refer to steps S110 to S113. There is no sequence between steps S102 to S106 and steps S110 to S113. That is, the audio allocation-related procedure and the picture allocation-related procedure may or may not be performed in parallel.

Figure 10:
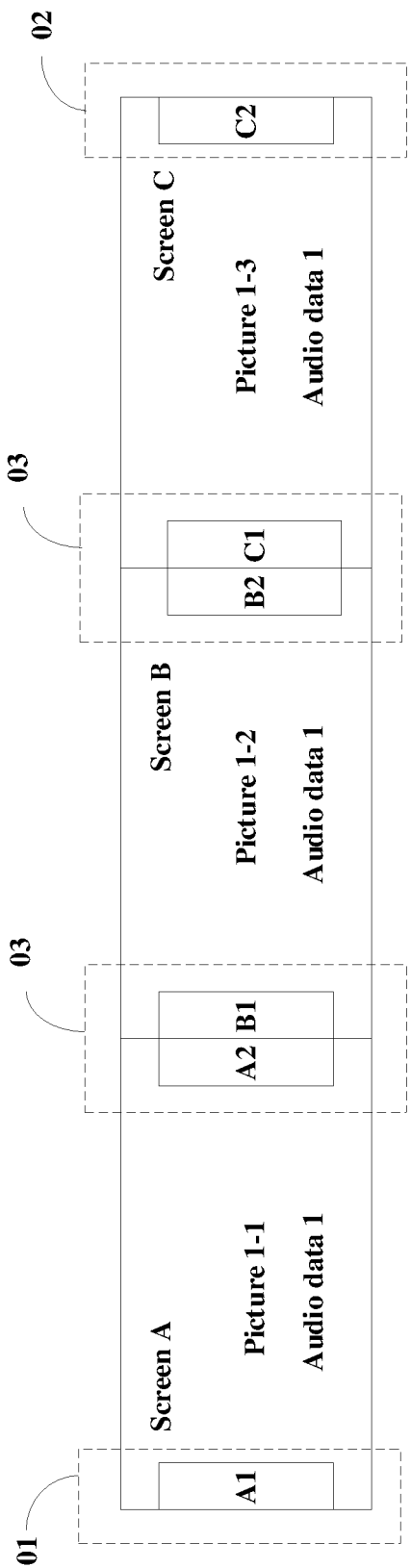
FIG. 10 is a schematic diagram of displaying a same picture in a splicing manner by screens in a spliced screen according to an embodiment of this application.

In some embodiments, the channel allocation policy in S103 is shown in FIG. 10. FIG. 10 is a schematic diagram of displaying a same picture in a splicing manner by screens in a spliced screen according to an embodiment of this application. FIG. 10 shows a manner of disposing a plurality of screens in a single row. As shown in FIG. 10, if a screen A, a screen B, and a screen C all correspond to the video source 1, the screen A, the screen B, and the screen C display the picture 1 in a splicing manner. Speakers A1, A2, B1, B2, C1, and C2 of the screen A, the screen B, and the screen C are used to play the audio data 1 of the video source 1, the speakers A1, A2, B1, B2, C1, and C2 form a speaker system used to play the audio data 1, and screens corresponding to the plurality of speakers in the speaker system are a plurality of screens in a same row. In this case, based on the channel allocation policy, that is, the speaker located on the left side of the spliced screen 20 corresponds to the left channel, the speaker located on the right side of the spliced screen 20 corresponds to the right channel, and the speakers located in the middle of the spliced screen 20 correspond to the center channel, channel types may be allocated to the speakers in the speaker system, that is, the left channel is allocated to A1, the center channel is allocated to A2, B1, B2, and C1, and the right channel is allocated to C2. The spliced screen provided in FIG. 10 may display video data based on a principle similar to that in S110 to S113, and details are not described herein again.

Figure 11:
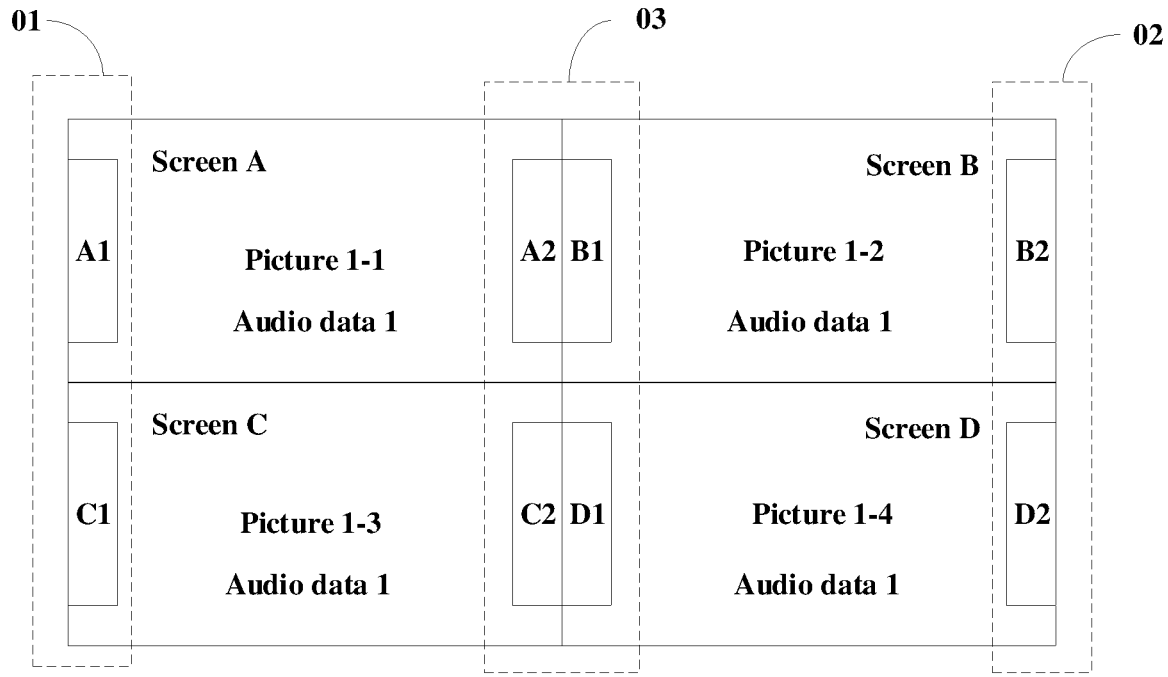
FIG. 11 is another schematic diagram of displaying a same picture in a splicing manner by screens in a spliced screen according to an embodiment of this application.

In some embodiments, the channel allocation policy in S103 is shown in FIG. 11. FIG. 11 is another schematic diagram of displaying a same picture in a splicing manner by screens in a spliced screen according to an embodiment of this application. FIG. 11 shows a manner of disposing a plurality of screens in a plurality of rows and a plurality of columns. As shown in FIG. 11, a screen A, a screen B, a screen C, and a screen D are all bound to the video source 1, and the screen A, the screen B, the screen C, and the screen D display the picture 1 in a splicing manner. Speakers A1, A2, B1, B2, C1, C2, D1, and D2 of the screen A, the screen B, the screen C, and the screen D may form a speaker system. Based on the channel allocation policy, that is, the speakers located on the left side of the spliced screen 20 correspond to the left channel, the speakers located on the right side of the spliced screen 20 correspond to the right channel, and the speakers located in the middle of the spliced screen 20 correspond to the center channel, channel types may be allocated to the speakers in the speaker system, that is, the left channel is allocated to A1 and C1, the center channel is allocated to A2, B1, C2, and D1, and the right channel is allocated to B2 and D2. The spliced screen provided in FIG. 11 may display video data based on a principle similar to that in S110 to S113, and details are not described herein again.

Embodiment 2

A difference from Embodiment 1 lies in that Embodiment 2 is for a case in which the spliced screen 20 simultaneously displays a plurality of pictures and each picture has a corresponding sound. In some scenarios, to facilitate simultaneous monitoring of two pictures and reduce switching operations between the pictures, a user may simultaneously display a plurality of pictures on the spliced screen 20. In some embodiments, the spliced screen 20 simultaneously plays different conference or conference site pictures. For example, a user may simultaneously view two conference site pictures. However, to avoid mutual interference between sounds of the two conference sites, the sound of only one conference site is turned on, and the sound of the other conference site is turned off. For example, the sound of a conference site A is turned on, and the sound of a conference site B is turned off. In this case, a picture of the conference site B may be viewed by using the spliced screen. When the sound of the conference site needs to be switched, the sound of the conference site A may be turned off, the sound of the conference site B may be turned on, and sound switching between the two conference sites is implemented by using a sound switch; or for a same scenario shot by a plurality of cameras from different angles, each picture displays a different angle of the same scenario, and these pictures all have a sound, but only one sound needs to be turned on to represent all the pictures. Because each picture has a sound corresponding to the picture, to avoid mutual interference between the pictures, a sound corresponding to a target picture needs to be selected for playing, and only a speaker of a screen displaying the target picture is selected as a speaker used to play the sound. A speaker system may be constructed by using speakers of the screen displaying the target picture, and a different channel type is allocated to each speaker in the speaker system, to achieve an effect of playing audio data in a stereophonic manner. It can be learned that, compared with Embodiment 1, a difference between Embodiment 1 and this embodiment lies in how to construct a speaker system. For a channel allocation policy of the speaker system, refer to Embodiment 1.

Figure 12:
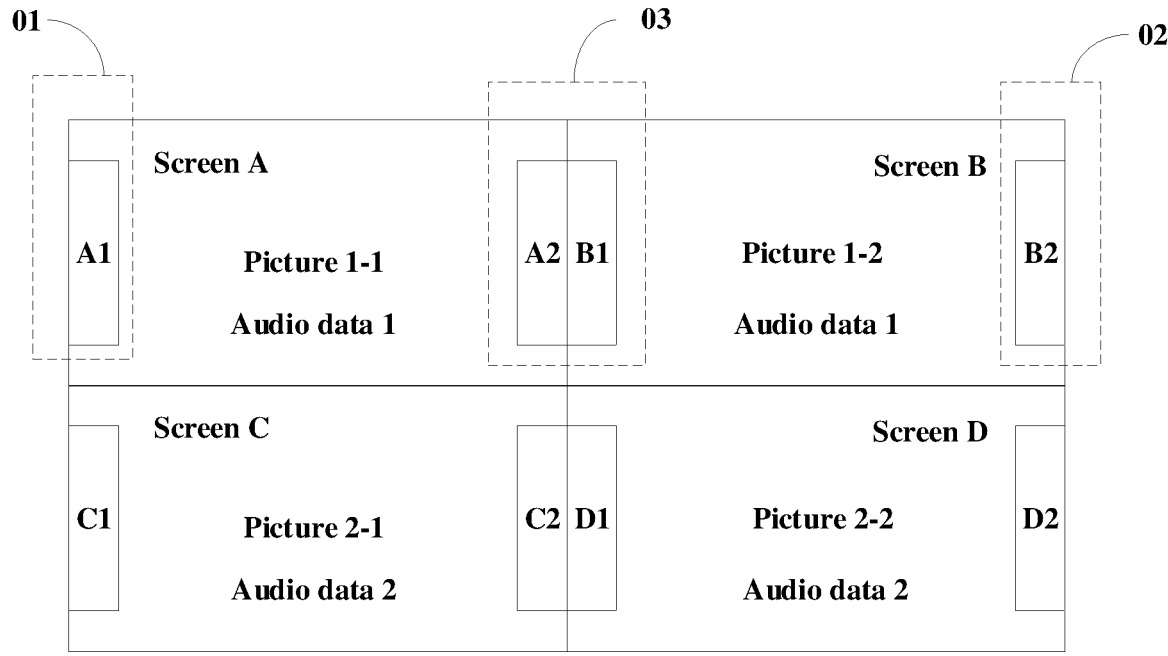
FIG. 12 is a schematic diagram of displaying different pictures in a splicing manner by screens in a spliced screen according to an embodiment of this application.

FIG. 12 is a schematic diagram of displaying different pictures in a splicing manner by screens in a spliced screen according to an embodiment of this application. As shown in FIG. 12, the spliced screen 20 includes a screen A, a screen B, a screen C, and a screen D. The screen A and the screen B are bound to a same video source (the video source 1). In this case, the screen A and the screen B play a same piece of video data (the video data 1), to display the same picture 1 in a splicing manner, and the screen C and the screen D are bound to a same video source (a video source 2). In this case, the screen C and the screen D play a same piece of video data (video data 2), to display a same picture 2 in a splicing manner. The picture 1 corresponds to the audio data 1, and the picture 2 corresponds to the audio data 2. To avoid mutual interference between sounds of the two pictures, audio data playing needs to be set. For example, if the user sends a requirement instruction to indicate to play a sound corresponding to the picture 1, that is, the audio data 1, in this case, a speaker system is constructed by using speakers of the screen A and the screen B, to display stereo. To avoid confusion between the pictures and the sounds, an instruction for indicating to turn off speakers of the screen C and the screen D may be generated.

Figure 13A:
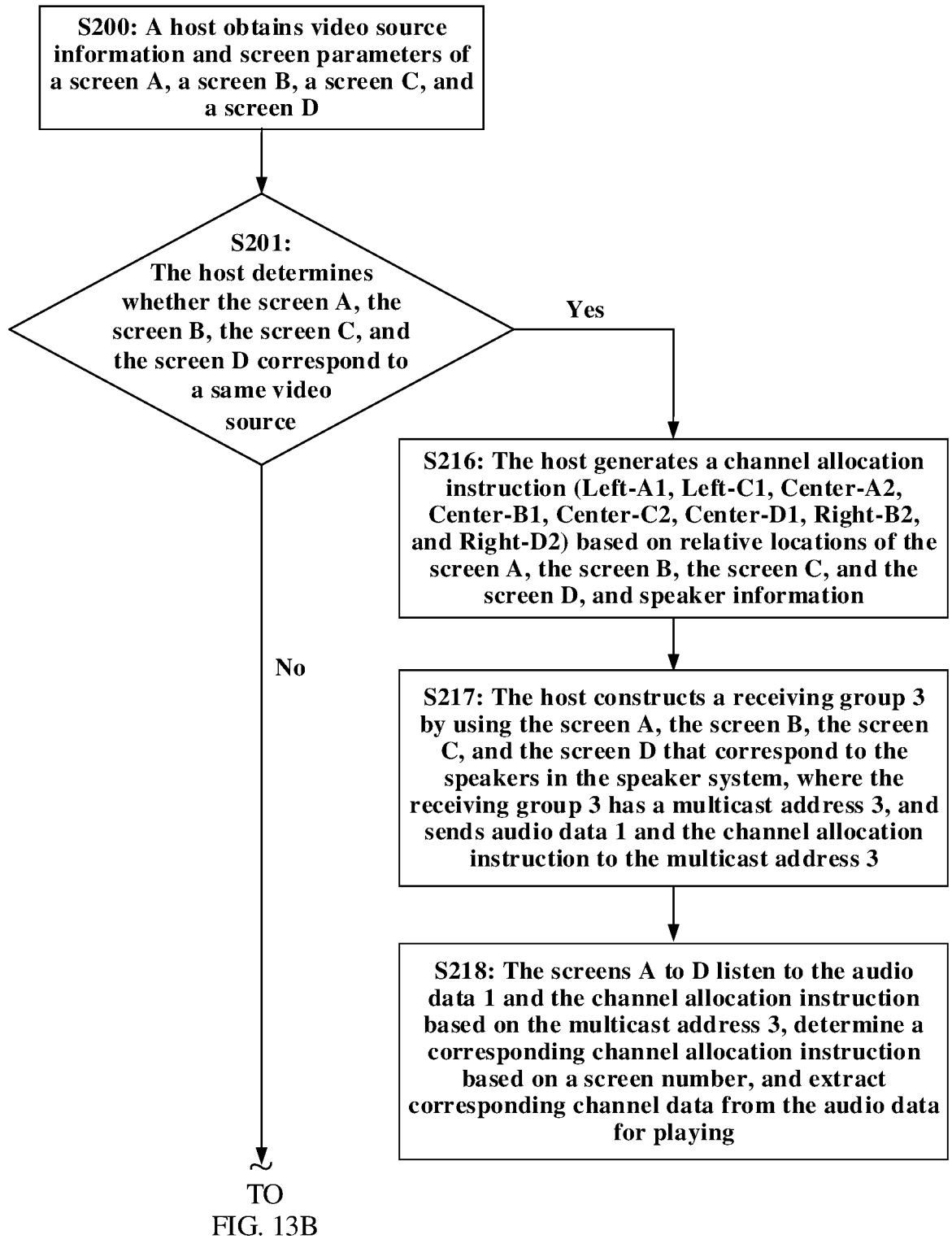
FIG. 13A and FIG. 13B are a flowchart of another method for allocating channels of a spliced screen according to an embodiment of this application.
Figure 13B:
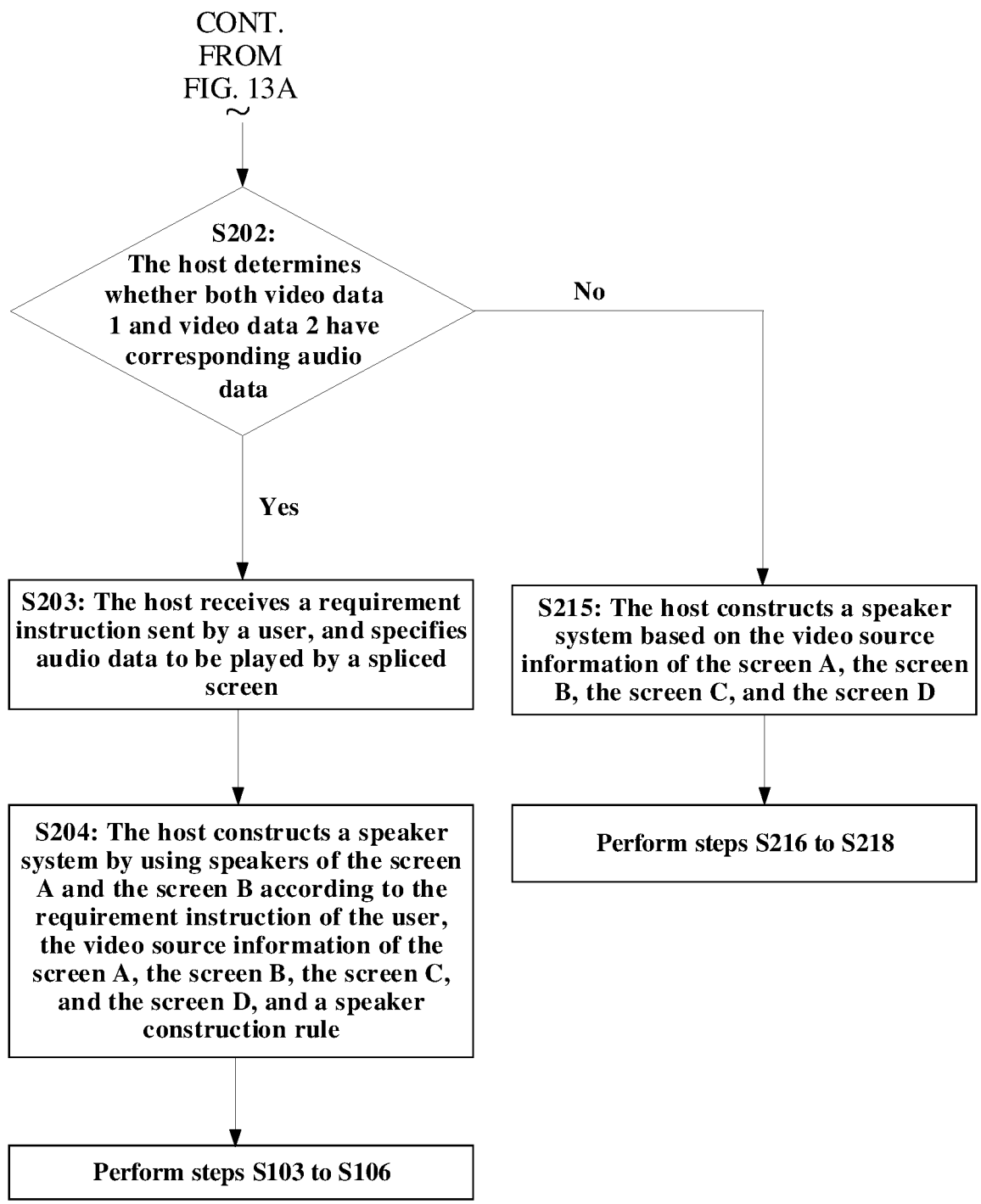

FIG. 13A and FIG. 13B are a flowchart of another method for allocating channels of a plurality of screens according to an embodiment of this application. As shown in FIG. 13A and FIG. 13B, the method includes the following steps.

S200: The host obtains video source information and screen parameters of the screen A, the screen B, the screen C, and the screen D.

For the video source information and the screen parameters obtained by the host, refer to the foregoing description of FIG. 12, and details are not described herein again.

S201: The host determines whether the screen A, the screen B, the screen C, and the screen D correspond to a same video source.

When determining that the screen A, the screen B, the screen C, and the screen D correspond to a same video source, the host performs the picture allocation method and the audio distribution method that correspond to FIG. 11 in Embodiment 1. When determining that the screen A, the screen B, the screen C, and the screen D correspond to different video sources, the host performs following audio allocation method.

S202: The host determines whether both the video data 1 and the video data 2 have corresponding audio data.

It may be determined, by determining a type of a data packet received by the communication module 110, whether the data packet includes audio data. Using FIG. 12 as an example, if it is determined that the video data 1 has corresponding audio data 1 and the video data 2 has corresponding audio data 2, the following steps are performed.

S203: The host receives the requirement instruction sent by the user, and specifies audio data to be played by the spliced screen.

The user sends the requirement instruction to the control module 105, where the requirement instruction is to indicate to play the audio data corresponding to the video data 1. In this embodiment, after receiving the requirement instruction, the control module 105 sends the requirement instruction to the audio management module 103, and the audio management module 103 may determine the audio data 1 corresponding to the picture 1 according to the requirement instruction.

Figure 14:
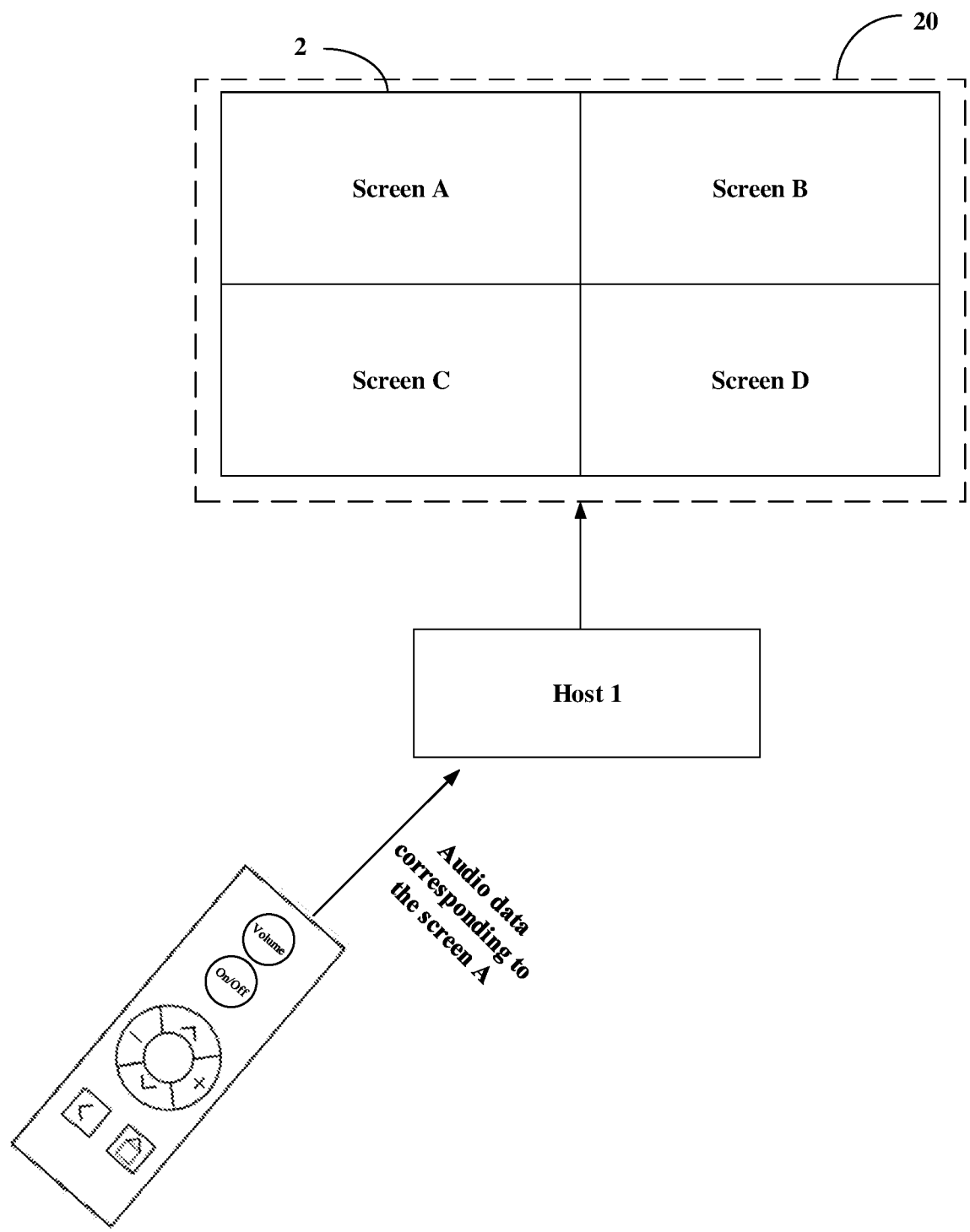
FIG. 14 is a schematic diagram of an operation of playing audio data by a remote control by selecting a screen according to an embodiment of this application.

In some embodiments, the requirement instruction may be selecting a screen for the user, where audio data corresponding to the screen is to-be-played audio data. For example, as shown in FIG. 14, the user sends the requirement instruction to the host 1 by using a remote control, where the requirement instruction indicates to play audio data corresponding to the screen A. In this embodiment, the screen A is a master screen. In some embodiments, the requirement instruction may also indicate to play audio data corresponding to another screen other than the master screen. After receiving the requirement instruction, the control module 105 sends the requirement instruction to the audio management module 103, and the audio management module 103 may determine, according to the requirement instruction, to play the audio data 1 corresponding to the screen A. In some embodiments, the requirement instruction may alternatively be playing specified audio data, for example, playing the audio data 1. After receiving the requirement instruction, the control module 105 sends the requirement instruction to the audio management module 103, and the audio management module 103 may determine, according to the requirement instruction, to play the audio data 1.

S204: The host constructs a speaker system by using the speakers of the screen A and the screen B according to the requirement instruction of the user, the video source information of the screen A, the screen B, the screen C, and the screen D, and a speaker construction rule.

It may be learned from S202 that both the video data 1 and the video data 2 have corresponding audio data. For the user, perception of a picture is usually implemented by using an auditory and visual combination, and the user may also identify a sound making direction by using a sound. Therefore, in order to avoid a problem of auditory-visual confusion caused by a failure of the user to recognize a correspondence between a sound and a picture, in this embodiment, a construction rule of the speaker system is: When two or more pictures are simultaneously played by the spliced screen 20, only a speaker of a screen corresponding to one of the pictures is used to construct the speaker system. In this case, when the user chooses to play the sound of the video data 1, it is equivalent to determining that the target screen is the screen A and the screen B. The audio management module 103 constructs a speaker system by using the speakers (A1, A2, B1, and B2) of the screen A and the screen B.

Figure 15:
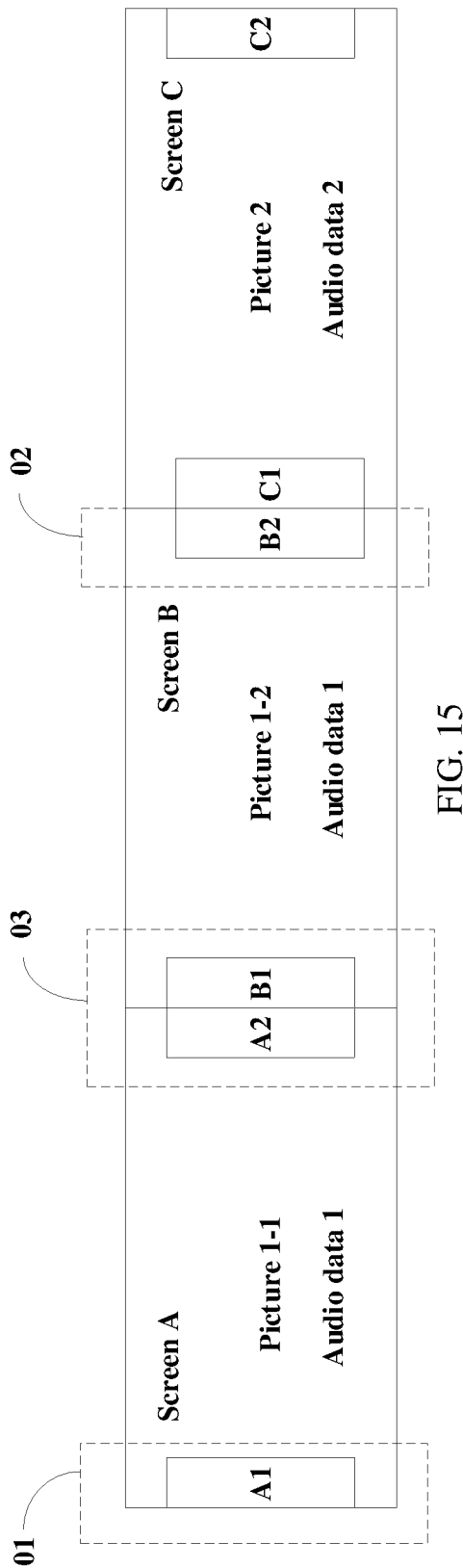
FIG. 15 is another schematic diagram of displaying different pictures in a splicing manner by screens in a spliced screen according to an embodiment of this application.

A second implementation scenario is provided based on the foregoing construction rule of the speaker system. FIG. 15 is another schematic diagram of displaying different pictures in a splicing manner by screens in a spliced screen according to an embodiment of this application. As shown in FIG. 15, the spliced screen includes a screen A, a screen B, and a screen C. Both the screen A and the screen B are bound to the video source 1, and the screen A and the screen B simultaneously play the video data 1 to display the picture 1 in a splicing manner. The screen C is bound to the video source 2, and the screen C plays the video data 2 to display the picture 2. In addition, both the video data 1 and the video data 2 have corresponding sound data. If the sound of the video data 1 needs to be played, the speaker system is constructed by using the speakers of the screen A and the screen B that play the picture 1.

S205: The host generates a channel allocation instruction Left-A1, Center-A2, Center-B1, and Right-B2 based on relative locations of the screen A and the screen B and speaker information.

In some embodiments, the speaker information of the screen A includes a binding relationship (Left-A1 and Right-A2) between a speaker number of each speaker on the screen A and a channel type, the speaker information of the screen B includes a binding relationship (Left-B1 and Right-B2) between a speaker number of each speaker on the screen B and a channel type, and the channel allocation instruction includes Left-A1, Center-A2, Center-B1, and Right-B2.

In this case, the speaker system plays the audio data 1. For the channel allocation policy for the speaker system in this embodiment, refer to S103 in Embodiment 1. Details are not described herein.

If the requirement instruction of the user indicates to play the sound of the video data 2, speakers of the screen C and the screen D may be selected based on the foregoing method to construct the speaker system, and stereo is played.

When the user needs to switch the played sound, the user may resend a requirement instruction to re-indicate a picture of the sound that needs to be played, and reallocate the audio data based on the foregoing steps.

S206: The host constructs a receiving group 3 by using the screen A and the screen B that correspond to the speakers in the speaker system, where the receiving group 3 has a multicast address 3, and sends the audio data 1 and the channel allocation instruction to the multicast address 3.

The speaker system includes speakers A1, A2, B1, and B2, corresponding to the screen A and the screen B. Therefore, the receiving group 3 includes the screen A and the screen B. For a process in which the audio and video distribution module 104 sends the audio data 1 and the channel allocation instruction (Left-A1, Center-A2-B1, and Right-B2) to the receiving group 3, refer to S105 in Embodiment 1, and details are not described herein.

In this way, the screen A, the screen B, the screen C, and the screen D may obtain corresponding audio and video data by using different multicast addresses, and do not interfere with each other.

S207: The screen A listens to the audio data 1 and the channel allocation instruction based on the multicast address 3, determines the corresponding channel allocation instruction (Left-A1 and Center-A2) based on the screen number A, extracts left channel data and center channel data from the audio data 1 based on Left-A1 and Center-A2, sends the left channel data to A1 for playing, and sends the center channel data to A2 for playing.

S208: The screen B listens to the audio data 1 and the channel allocation instruction based on the multicast address 3, extracts the center channel data and the right channel data from the audio data 1 based on Center-B1 and Right-B2, sends the center channel data to B1 for playing, and sends the right channel data to B2 for playing.

The method for extracting, by the screen A and the screen B, corresponding channel data from the audio data 1 according to the channel allocation instruction is similar to S105 and S106 in Embodiment 1, and details are not described herein.

In this embodiment, for a method for allocating, by the host 1, video data to the screen A and the screen B and allocating video data to the screen C and the screen D, refer to a method similar to that in S110 to S113 in Embodiment 1. The method is specifically as follows:

S209: The host generates a first picture allocation instruction (A-picture 1-N1 and B-picture 1-N2) and a second picture allocation instruction (C-picture 2-N1 and D-picture 2-N2) based on the video source information and relative locations of the screen A, the screen B, the screen C, and the screen D.

The host 1 receives video data on a network side by using the communication module 110. The video source information of the screen A is that the screen A is bound to the video source 1, the video source information of the screen B is that the screen B is bound to the video source 1, the relative location of the screen A is the master screen, the relative location of the screen B is located on the right side of the screen A, the screen number of the screen A is A, the screen number of the screen B is B, the video source information of the screen C is that the screen C is bound to the video source 2, the video source information of the screen D is that the screen D is bound to the video source 2, the relative location of the screen C is below the screen A, the relative location of the screen D is a lower right side of the screen A, the screen number of the screen C is C, and the screen number of the screen D is D.

In S201, it may be determined that the screen A and the screen B are bound to a same video source (the video source 1), that is, a same piece of video data (the video data 1) is played in a splicing manner to display the picture 1; and it is determined that the screen C and the screen D are bound to a same video source (the video source 2), that is, a same piece of video data (the video data 2) is played in a splicing manner to display the picture 2. For a method for generating, by the play management module 102, the first picture allocation instruction for the screen A and the screen B, and generating the second picture allocation instruction for the screen C and the screen D, refer to S110 in Embodiment 1, and details are not described herein.

S210: Based on the video source information of the screen A, the screen B, the screen C, and the screen D, the host constructs a receiving group 1 by using the screen A and the screen B, where the receiving group 1 has a multicast address 1, constructs a receiving group 2 by using the screen C and the screen D, where the receiving group 2 has a multicast address 2, sends the video data 1 and the first picture allocation instruction to the multicast address 1, and sends the video data 2 and the second picture allocation instruction to the multicast address 2.

The play management module 102 determines a receiving group based on the video source information of the screen, and divides screens bound to a same video source into a same receiving group. It can be learned based on the video source information of each screen 2 (the screen A is bound to the video source 1, the screen B is bound to the video source 1, the screen C is bound to the video source 2, and the screen D is bound to the video source 2) that, the screen A and the screen B are bound to the same video source (the video source 1), and the screen C and the screen D are bound to the same video source (the video source 2). Therefore, the play management module 102 divides the screen A and the screen B into a same receiving group, for example, a receiving group 1, and divides the screen C and the screen D into a same receiving group, for example, a receiving group 2. Both the receiving group 1 and the receiving group 2 are used to receive data related to the video data.

If the audio and video distribution module 104 sends data to the receiving group 1 and the receiving group 2 in a multicast manner, a multicast address, for example, the multicast address 1, needs to be allocated to the receiving group 1, and a multicast address, for example, the multicast address 2, needs to be allocated to the receiving group 2. In this way, the audio and video distribution module 104 may send the video data 1 and the first picture allocation instruction (A-picture 1-N1 and B-picture 1-N2) to the multicast address 1, and send the video data 2 and the second picture allocation instruction (C-picture 2-N1 and D-picture 2-N2) to the multicast address 2. For a method for sending data by the audio and video distribution module 104, refer to S104 in Embodiment 1, and details are not described herein.

S211: The screen A listens to the video data 1 and the first picture allocation instruction based on the multicast address 1, determines the corresponding picture allocation instruction (A-picture 1-N1) based on the screen number A, and extracts the picture 1-N1 from the video data 1 based on A-picture 1-N1 for display.

S212: The screen B listens to the video data 1 and the first picture allocation instruction based on the multicast address 1, determines the corresponding picture allocation instruction (B-picture 1-N2) based on the screen number B, and extracts the picture 1-N2 from the video data 1 based on B-picture 1-N2 for display.

S213: The screen C listens to the video data 2 and the second picture allocation instruction based on the multicast address 2, determines the corresponding picture allocation instruction (C-picture 2-N1) based on the screen number C, and extracts the picture 2-N1 from the video data 2 based on C-picture 2-N1 for display.

S214: The screen D listens to the video data 2 and the second picture allocation instruction based on the multicast address 2, determines the corresponding picture allocation instruction (D-picture 2-N2) based on the screen number D, and extracts the picture 2-N2 from the video data 2 based on D-picture 2-N2 for display.

The method for extracting, by the screen A and the screen B, the corresponding pictures from the video data 1 according to the first picture allocation instruction, and extracting, by the screen C and the screen D, the corresponding pictures from the video data 2 according to the second picture allocation instruction is similar to S112 and S113 in Embodiment 1, and details are not described herein.

It can be learned that, in this embodiment, even if the spliced screen 20 displays different pictures, it may be controlled that no interference occurs between sounds played by the spliced screen 20. In addition, when the sound is played, a speaker system with a center channel is constructed by using speakers of screens that play a same picture, to achieve an effect of playing stereo, thereby improving audio play quality and improving auditory-visual experience of the user.

Embodiment 3

A difference from Embodiment 2 lies in that Embodiment 3 is for a case in which the spliced screen 20 simultaneously displays a plurality of pictures and at least one picture does not have a corresponding sound. In some embodiments, for example, in explanation pictures, one picture displays an action and a voice of an explainer, and the other picture displays an explained object without sound; or one picture displays a word picture without sound, and the other picture is a music picture. For this case, if the user specifies target audio data, the target audio data is jointly played by using a speaker of an adjacent screen that is in a same row or a same column as a screen corresponding to the target audio data and that has no corresponding audio data.

Figure 16:
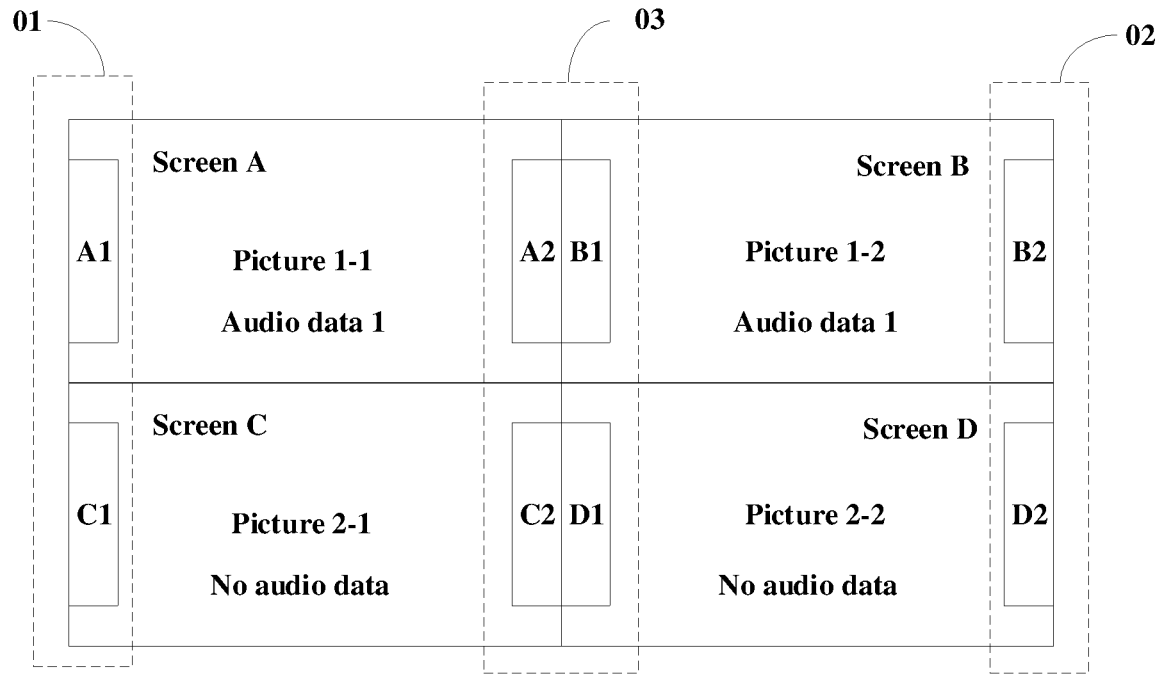
FIG. 16 is another schematic diagram of displaying different pictures in a splicing manner by screens in a spliced screen according to an embodiment of this application.

In this embodiment, a construction policy of a speaker system is: determining a target screen for playing a same video source, and selecting an adjacent screen of the target screen, where the adjacent screen has no corresponding audio data, and the adjacent screen and the target screen may be adjacent in a same row or a same column. The speaker system is constructed by using a speaker of the target screen and a speaker of the adjacent screen. FIG. 16 is another schematic diagram of displaying different pictures in a splicing manner by screens in a spliced screen according to an embodiment of this application. As shown in FIG. 16, the spliced screen 20 includes a screen A, a screen B, a screen C, and a screen D. Both the screen A and the screen B are bound to a video source 1, and the screen A and the screen B simultaneously play video data 1 to display a picture 1 in a splicing manner. Both the screen C and the screen D are bound to a video source 2, and the screen C and the screen D simultaneously play video data 2 to display a picture 2 in a splicing manner. The video data 1 has corresponding audio data 1, but the video data 2 has no corresponding audio data. In this case, a speaker system may be constructed by using speakers of the screen A, the screen B, the screen C, and the screen D, and the audio data 1 is played by using the speaker system.

As shown in FIG. 13A and FIG. 13B, after determining in S202, if the video data 1 has the corresponding audio data 1, and the video data 2 has no corresponding audio data, the following steps are performed.

S215: The host constructs a speaker system based on video source information of the screen A, the screen B, the screen C, and the screen D.

S2151: The play management module 102 determines, based on a requirement instruction and the video source information of the screen A, the screen B, the screen C, and the screen D, target screens, that is, the screen A and the screen B that are used to play the video data 1.

S2152: The play management module 102 determines, based on relative locations of the screen A, the screen B, the screen C, and the screen D, adjacent screens, that is, the screen C and the screen D that are located in same columns as the screen A and the screen B and that have no corresponding audio data.

As shown in FIG. 16, a soundless screen, that is, the screen C, is located right below the target screen, that is, the screen A, and is adjacent to the screen A, and a soundless screen, that is, the screen D, is located right below the target screen, that is, the screen B, and is adjacent to the screen B.

S2153: The play management module 102 constructs a speaker system by using speakers of the target screens (the screen A and the screen B) and adjacent screens (the screen C and the screen D).

It can be learned that, the play management module 102 may construct a speaker system by using speakers of the target screens, that is, the screen A and the screen B, and the adjacent screens, that is, the screen C and the screen D. The speaker system includes speakers A1, A2, B1, B2, C1, C2, D1, and D2.

S216: The host generates a channel allocation instruction (Left-A1, Left-C1, Center-A2, Center-B1, Center-C2, Center-D1, Right-B2, and Right-D2) based on the relative locations of the screen A, the screen B, the screen C, and the screen D, and the speaker information.

Speaker information of the screen A includes a binding relationship (Left-A1 and Right-A2) between a speaker number of each speaker on the screen A and a channel type, speaker information of the screen B includes a binding relationship (Left-B1 and Right-B2) between a speaker number of each speaker on the screen B and a channel type, speaker information of the screen C includes a binding relationship (Left-C1 and Right-C2) between a speaker number of each speaker on the screen C and a channel type, speaker information of the screen D includes a binding relationship (Left-D1 and Right-D2) between a speaker number of each speaker on the screen D and a channel type, and the channel allocation instruction includes Left-A1, Left-C1, Center-A2, Center-B1, Center-C2, Center-D1, Right-B2, and Right-D2.

The foregoing constructed speaker system is the same as the speaker system constructed in FIG. 11 in Embodiment 1. Therefore, the channel allocation instruction may be generated by using a channel allocation policy similar to that in S103. Details are not described herein.

S217: The host constructs a receiving group 3 by using the screen A, the screen B, the screen C, and the screen D that correspond to the speakers in the speaker system, where the receiving group 3 has a multicast address 3, and sends the audio data 1 and the channel allocation instruction to the multicast address 3.

In this embodiment, the speaker system includes the speakers A1, A2, B1, B2, C1, C2, D1 and D2, corresponding to the screen A, the screen B, the screen C, and the screen D. Therefore, the receiving group 3 includes the screen A, the screen B, the screen C, and the screen D. The audio and video distribution module 104 needs to send, to the receiving group 3, the audio data 1 corresponding to the video data 1, and the channel allocation instruction Left-A1, Left-C1, Center-A2, Center-B1, Center-C2, Center-D1, Right-B2, and Right-D2. The foregoing multicast process may use a method similar to that in S104 in Embodiment 1. Details are not described herein.

S218: The screens A to D listen to the audio data 1 and the channel allocation instruction based on the multicast address 3, determine a corresponding channel allocation instruction based on a screen number, and extract corresponding channel data from the audio data for playing. A specific process is as follows:

S218a: The screen A listens to the audio data 1 and the channel allocation instruction based on the multicast address 3, determines the corresponding channel allocation instruction Left-A1 and Center-A2 based on the screen number A, extracts left channel data and center channel data from the audio data 1 based on Left-A1 and Center-A2, sends the left channel data to A1 for playing, and sends the center channel data to A2 for playing.

S218b: The screen B listens to the audio data 1 and the channel allocation instruction based on the multicast address 3, determines the corresponding channel allocation instruction (Center-B1 and Right-B2) based on the screen number B, extracts center channel data and right channel data from the audio data 1 based on Center-B1 and Right-B2, sends the center channel data to B1 for playing, and sends the right channel data to B2 for playing.

S218c: The screen C listens to the audio data 1 and the channel allocation instruction based on the multicast address 3, determines the corresponding channel allocation instruction (Left-C1 and Center-C2) based on the screen number C, extracts left channel data and center channel data from the audio data 1 based on Left-C1 and Center-C2, sends the left channel data to C1 for playing, and sends the center channel data to C2 for playing.

S218d: The screen D listens to the audio data 1 and the channel allocation instruction based on the multicast address 3, determines the corresponding channel allocation instruction (Center-D1 and Right-D2) based on the screen number D, extracts center channel data and right channel data from the audio data 1 based on Center-D1 and Right-D2, sends the center channel data to D1 for playing, and sends the right channel data to D2 for playing.

The method for extracting, by the screen A, the screen B, the screen C, and the screen D, corresponding channel data from the audio data 1 according to the channel allocation instruction is similar to S105 and S106 in Embodiment 1, and details are not described herein.

In this embodiment, for a method for allocating, by the host 1, video data to the screen A and the screen B and allocating video data to the screen C and the screen D, refer to a method similar to that in S110 to S113 in Embodiment 1 and that in S209 to S214 in Embodiment 2. The method is specifically as follows:

S219: The host generates a first picture allocation instruction (A-picture 1-N1 and B-picture 1-N2) and a second picture allocation instruction (C-picture 2-N1 and D-picture 2-N2) based on the video source information and the relative locations of the screen A, the screen B, the screen C, and the screen D.

The foregoing case in which the spliced screen 20 simultaneously displays two different pictures (the screen A and the screen B display the picture 1, and the screen C and the screen D display the picture 2) shows a same picture display manner as FIG. 12 in Embodiment 2. Therefore, the method for generating the picture allocation instruction by the host is similar to S209 in Embodiment 2. Details are not described herein.

S210: Based on the video source information of the screen A, the screen B, the screen C, and the screen D, the host constructs a receiving group 1 by using the screen A and the screen B, where the receiving group 1 has a multicast address 1, constructs a receiving group 2 by using the screen C and the screen D, where the receiving group 2 has a multicast address 2, sends the video data 1 and the first picture allocation instruction to the multicast address 1, and sends the video data 2 and the second picture allocation instruction to the multicast address 2.

The foregoing process is similar to that in S210 in Embodiment 2. Details are not described herein.

S211: The screen A listens to the video data 1 and the first picture allocation instruction based on the multicast address 1, determines the corresponding picture allocation instruction (A-picture 1-N1) based on the screen number A, and further extracts the picture 1-N1 from the video data 1 based on A-picture 1-N1 for display.

S212: The screen B listens to the video data 1 and the first picture allocation instruction based on the multicast address 1, determines the corresponding picture allocation instruction (B-picture 1-N2) based on the screen number B, and further extracts the picture 1-N2 from the video data 1 based on B-picture 1-N2 for display.

S213: The screen C obtains the video data 2 and the second picture allocation instruction based on the multicast address 2, determines the corresponding picture allocation instruction (C-picture 2-N1) based on the screen number C, and extracts the picture 2-N1 from the video data 2 based on C-picture 2-N1 for display.

S214: The screen D listens to the video data 2 and the second picture allocation instruction based on the multicast address 2, determines the corresponding picture allocation instruction (D-picture 2-N2) based on the screen number D, and extracts the picture 2-N2 from the video data 2 based on D-picture 2-N2 for display.

The method for extracting, by the screen A and the screen B, the corresponding pictures from the video data 1 according to the first picture allocation instruction, and extracting, by the screen C and the screen D, the corresponding pictures from the video data 2 according to the second picture allocation instruction is similar to S112 and S113 in Embodiment 1 and S211 to S214 in Embodiment 2, and details are not described herein.

Figure 17:
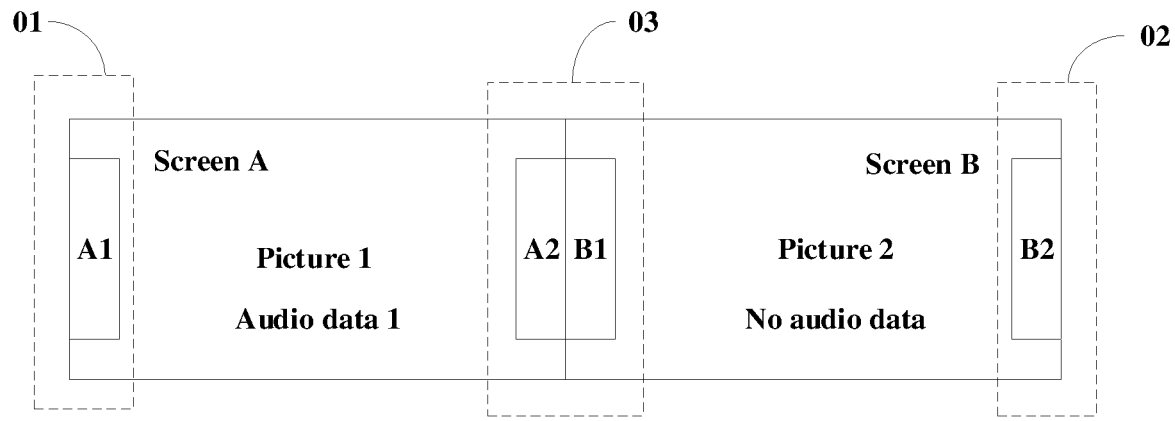
FIG. 17 is another schematic diagram of displaying different pictures in a splicing manner by screens in a spliced screen according to an embodiment of this application.

In some embodiments, in step S301, the method for constructing a speaker system may be shown in FIG. 17. FIG. 17 is another schematic diagram of displaying different pictures in a splicing manner by screens in a spliced screen according to an embodiment of this application. As shown in FIG. 17, the spliced screen 20 includes a screen A and a screen B. The screen A is bound to a video source 1, and video data 1 is played to display a picture 1, and the screen B is bound to a video source 2, and video data 2 is played to display a picture 2. In addition, the video data 1 has corresponding audio data 1, and the video data 2 has no corresponding audio data. In this case, the target screen is the screen A, and the adjacent screen is the screen B. Speakers of the screen A and the screen B may be used together to construct a speaker system with a center channel, and based on the channel allocation policy corresponding to the speaker system shown in FIG. 5 in Embodiment 1, channels are allocated to the speakers in the speaker system. To be specific, a left channel 01 is allocated to the speaker A1, a right channel 02 is allocated to the speaker B2, and a center channel 03 is allocated to the speaker A2 and the speaker B1.

Figure 18:
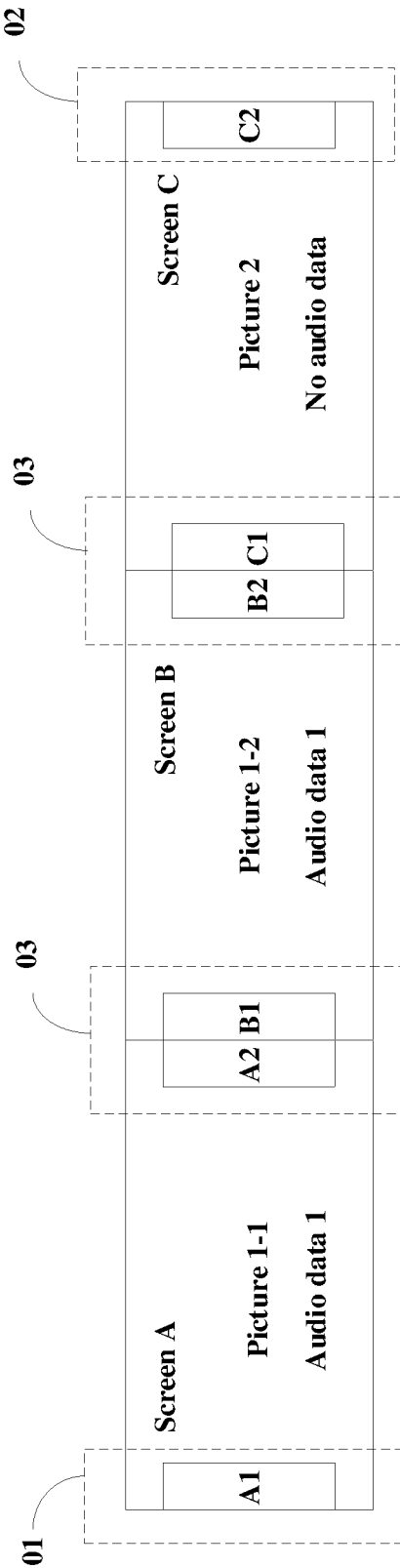
FIG. 18 is another schematic diagram of displaying different pictures in a splicing manner by screens in a spliced screen according to an embodiment of this application.

In some embodiments, in step S215, the method for constructing a speaker system may be further shown in FIG. 18. FIG. 18 is another schematic diagram of displaying different pictures in a splicing manner by screens in a spliced screen according to an embodiment of this application. The spliced screen includes a screen A, a screen B, and a screen C. Both the screen A and the screen B are bound to a video source 1, and the screen A and the screen B simultaneously play video data 1, to display a picture 1 in a splicing manner. The screen C is bound to a video source 2, and the screen C plays video data 2 to display a picture 2. In addition, the video data 1 has corresponding audio data 1, and the video data 2 has no corresponding audio data. In this case, the target screens are the screen A and the screen B, and the adjacent screen is the screen C. A speaker system may be jointly formed by using the speakers of the screen A, the screen B, and the screen C. A channel may be allocated to each speaker in the speaker system with reference to the channel allocation policy in S103 to S106 in Embodiment 1.

Figure 19:
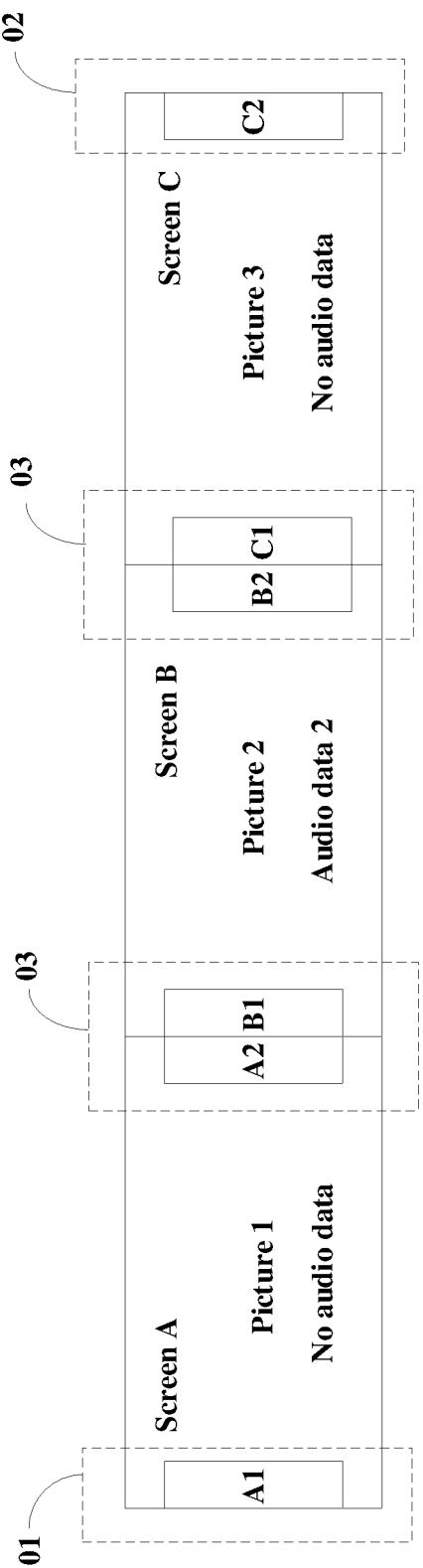
FIG. 19 is another schematic diagram of displaying different pictures in a splicing manner by screens in a spliced screen according to an embodiment of this application.

In some embodiments, in step S215, the method for constructing a speaker system may further be shown in FIG. 19. FIG. 19 is another schematic diagram of displaying different pictures in a splicing manner by screens in a spliced screen according to an embodiment of this application. The spliced screen includes a screen A, a screen B, and a screen C. The screen A is bound to a video source 1, and video data 1 is played to display a picture 1. The screen B is bound to a video source 2, and video data 2 is played to display a picture 2. The screen C is bound to a video source 3, and video data 3 is played to display a picture 3. In addition, only the video data 2 has corresponding audio data 2. Because the screen A and the screen C do not need to play audio data, speakers of the screen A and the screen C are idle, and a sound of the picture 2 may be played jointly by using the speakers of the screen A and the screen C. In this case, the target screen is the screen B, and the adjacent screens are the screen A and the screen C. A speaker system with a center channel may be formed by using the speakers of the screen A, the screen B, and the screen C, to play audio data 1, and a channel may be allocated to each speaker in the speaker system with reference to the channel allocation policy in S103 to S106 in Embodiment 1.

Figure 20:
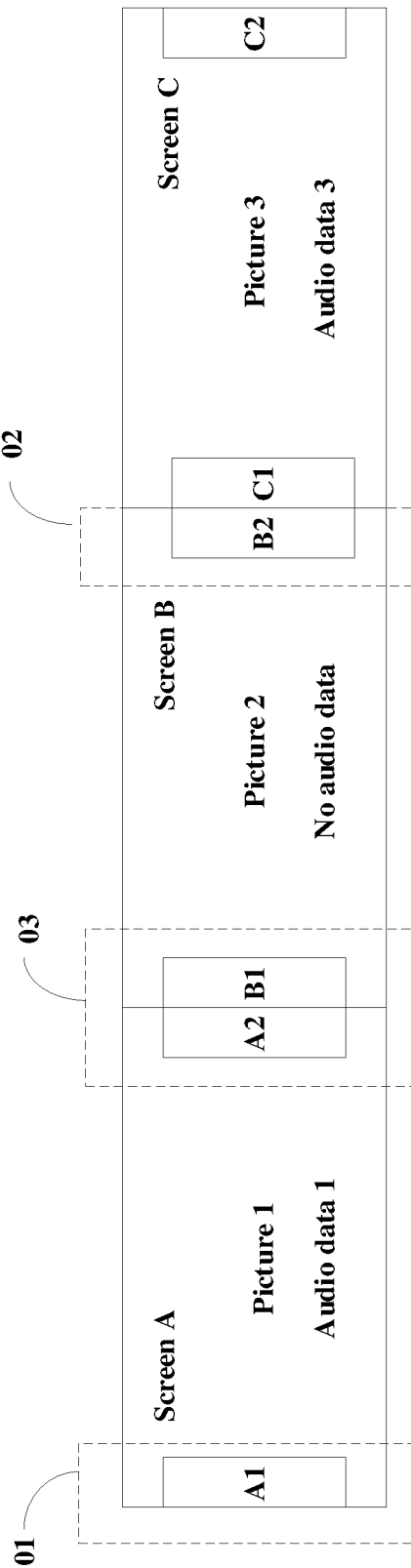
FIG. 20 is another schematic diagram of displaying different pictures in a splicing manner by screens in a spliced screen according to an embodiment of this application.

In some embodiments, in step S204, the method for constructing a speaker system may further be shown in FIG. 20. FIG. 20 is another schematic diagram of displaying different pictures in a splicing manner by screens in a spliced screen according to an embodiment of this application. The spliced screen includes a screen A, a screen B, and a screen C. The screen A is bound to a video source 1, and video data 1 is played to display a picture 1. The screen B is bound to a video source 2, and video data 2 is played to display a picture 2. The screen C is bound to a video source 3, and video data 3 is played to display a picture 3. In addition, the video data 1 has corresponding audio data 1, the video data 3 has corresponding audio data 3, and the video data 2 has no corresponding audio data.

A user may send a requirement instruction to indicate a sound of which video data is to be played, for example, indicate to play the video data 1.

The play management module 102 allocates the video data 1 corresponding to the picture 1 to the screen A, allocates the video data 2 corresponding to the picture 2 to the screen B, and allocates the video data 3 corresponding to the picture 3 to the screen C.

The audio management module 103 allocates audio data according to the requirement instruction. Because the screen B itself does not need to play audio data, the speaker of the screen B is idle, and the sound of the video data 1 may be jointly played by using the speaker of the screen B. Because the screen C itself has a corresponding sound, to avoid confusion between the sound of the picture 1 and the sound of the picture 3, the speaker of the screen C is not used to play the sound of the video data 1. In this case, the target screen is the screen A, and the adjacent screen is the screen B. The audio management module 103 allocates audio data 1 corresponding to the video data 1 to the screen A and the screen B, and the speakers of the screen A and the screen B form a speaker system with a center channel to play the audio data 1. A channel may be allocated to each speaker in the speaker system based on the channel allocation policy disclosed in FIG. 5 in Embodiment 1, and the speaker of the screen C does not make a sound.

If the user chooses to play the sound of the video data 2, the target screen is the screen C, and the adjacent screen is the screen B. The speakers of the screen B and the screen C construct a speaker system with a center channel to play audio data 2 corresponding to the video data 2, and the speaker of the screen A does not make a sound.

Figure 21:
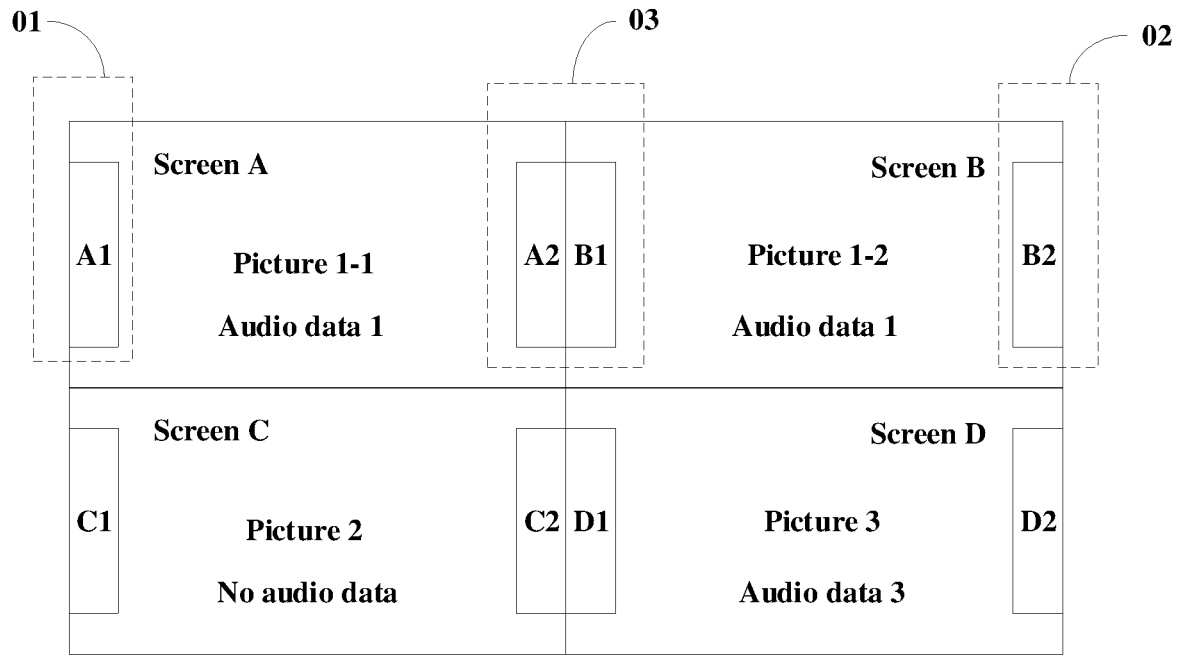
FIG. 21 is another schematic diagram of displaying different pictures in a splicing manner by screens in a spliced screen according to an embodiment of this application.

In some embodiments, in step S204, the method for constructing a speaker system may further be shown in FIG. 21. FIG. 21 is another schematic diagram of displaying different pictures in a splicing manner by screens in a spliced screen according to an embodiment of this application. The spliced screen includes a screen A, a screen B, a screen C, and a screen D. The screen A and the screen B are bound to a video source 1, and video data 1 is played at the same time to display a picture 1 in a splicing manner. The screen C is bound to a video source 2, and video data 2 is played to display a picture 2. The screen D is bound to a video source 3, and video data 3 is played to display a picture 3. In addition, the video data 1 has corresponding audio data 1, the video data 3 has corresponding audio data 3, and the video data 2 has no corresponding audio data.

In this implementation, although the screen C does not need to play audio data, and the speaker of the screen C is idle, if the speakers of the screen A, the screen B, and the screen C jointly form a speaker system, a spatial shape of the speaker system does not conform to an auditory habit of a human ear, and consequently causes interference to an auditory sense. Therefore, in this implementation, only the speakers of the screen A and the screen B are still selected to construct a speaker system with a center channel, to play the audio data 1 corresponding to the picture 1. A channel may be allocated to each speaker in the speaker system based on the channel allocation policy disclosed in FIG. 5 in Embodiment 1.

Figure 22:
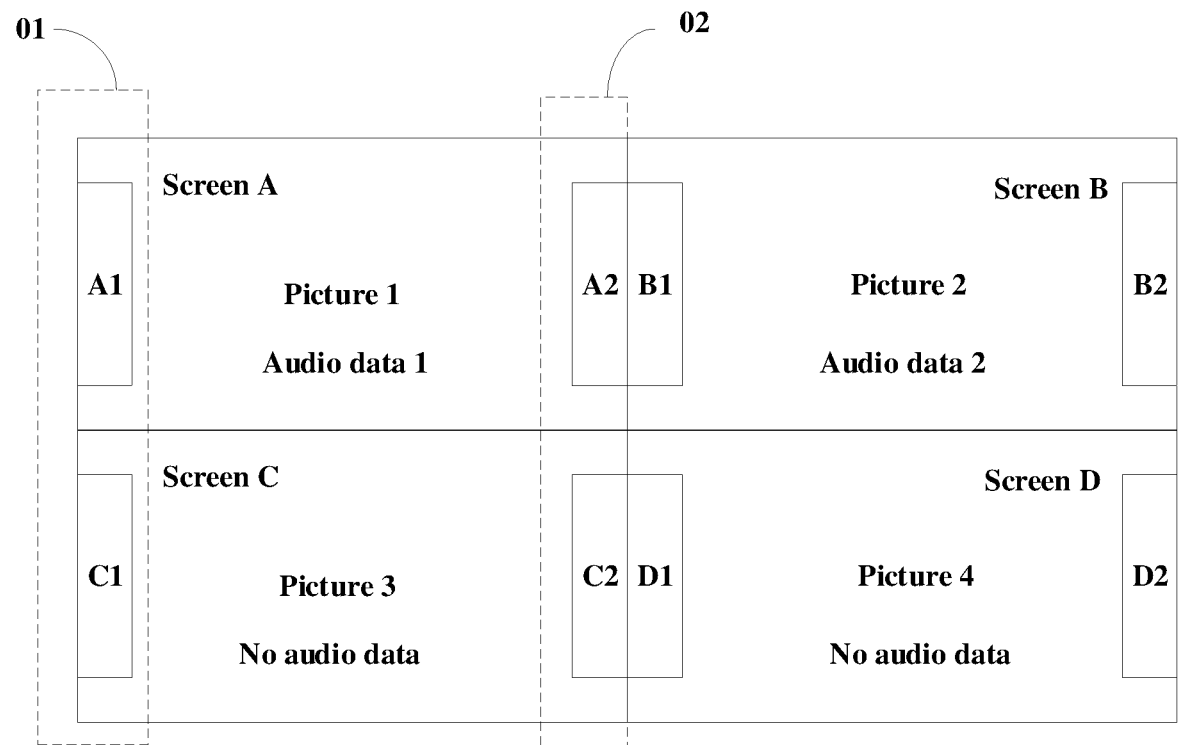
FIG. 22 is another schematic diagram of displaying different pictures in a splicing manner by screens in a spliced screen according to an embodiment of this application.

In some embodiments, in step S204, the method for constructing a speaker system may further be shown in FIG. 22. FIG. 22 is another schematic diagram of displaying different pictures in a splicing manner by screens in a spliced screen according to an embodiment of this application. The spliced screen includes a screen A, a screen B, a screen C, and a screen D. The screen A is bound to a video source 1, and video data 1 is played to display a picture 1. The screen B is bound to a video source 2, and video data 2 is played to display a picture 2. The screen C is bound to a video source 3, and video data 3 is played to display a picture 3. The screen D is bound to a video source 4, and video data 4 is played to display a picture 4. In addition, the video data 1 has corresponding audio data 1, the video data 2 has corresponding audio data 2, and the video data 3 and the video data 4 have no corresponding audio data.

The user may send a requirement instruction to indicate a sound of which video data is to be played, for example, indicate to play the sound of the video data 1. Because the screen C and the screen D do not need to play audio data, the speakers of the screen C and the screen D are idle. If the speakers of the screen A, the screen C, and the screen D are jointly used to play the sound of the video data 1, a shape formed by the speakers of the three screens does not conform to an auditory habit of a human ear. Therefore, this construction manner is usually not used. Only the speakers of the screen A and the screen C are selected to form a speaker system. To be specific, a first speaker A1 of the screen A and a first speaker C1 of the screen C correspond to a left channel, and a second speaker A2 of the screen A and a second speaker C2 of the screen C correspond to a right channel.

Figure 23:
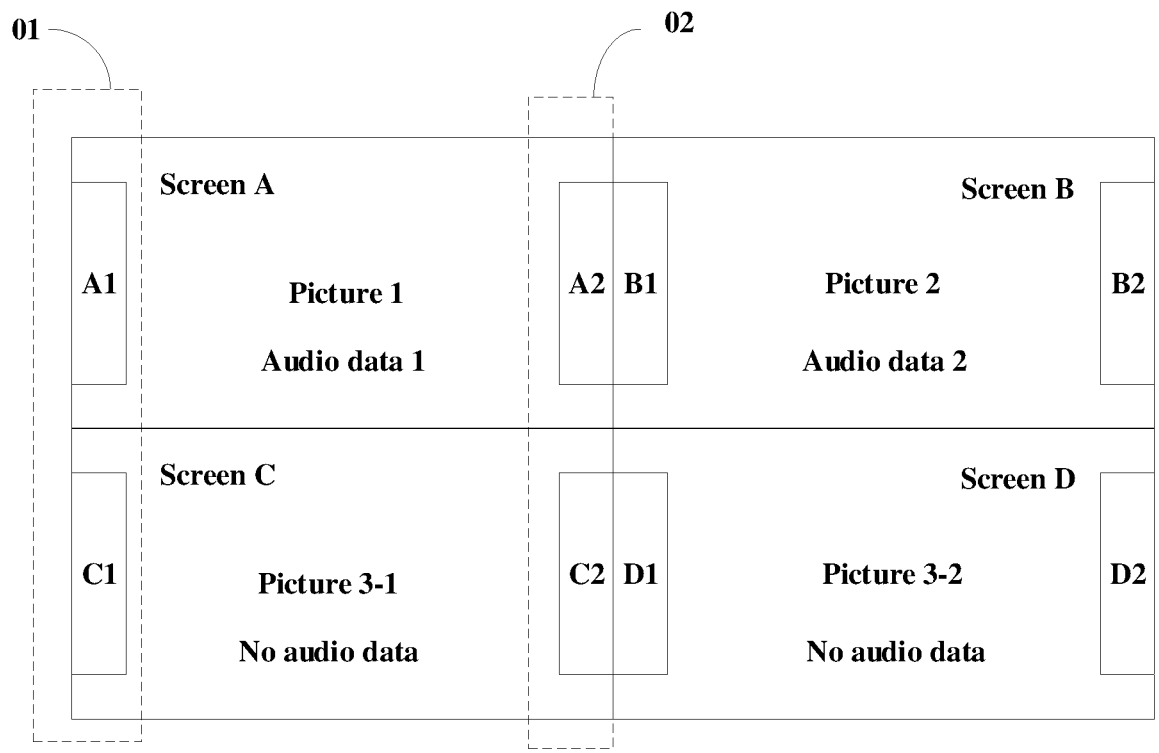
FIG. 23 is another schematic diagram of displaying different pictures in a splicing manner by screens in a spliced screen according to an embodiment of this application.

In some embodiments, in step S204, the method for constructing a speaker system may further be shown in FIG. 23. FIG. 23 is another schematic diagram of displaying different pictures in a splicing manner by screens in a spliced screen according to an embodiment of this application. The spliced screen includes a screen A, a screen B, a screen C, and a screen D. The screen A is bound to a video source 1, and video data 1 is played to display a picture 1. The screen B is bound to a video source 2, and video data 2 is played to display a picture 2. Both the screen C and the screen D are bound to a video source 3, and video data 3 is played at the same time to display a picture 3 in a splicing manner. In addition, the video data 1 has corresponding audio data 1, the video data 2 has corresponding audio data 2, and the video data 3 has no corresponding audio data.

A requirement instruction may be sent to indicate a sound of which video data is to be played, for example, indicate to play the sound of the video data 1. Because the screen C and the screen D do not need to play audio data, the speakers of the screen C and the screen D are idle. If the speakers of the screen A, the screen C, and the screen D are jointly used to play the sound of the video data 1, a shape formed by the speakers of the three screens does not conform to an auditory habit of a human ear. Therefore, this construction manner is usually not used. Only the speakers of the screen A and the screen C are selected to form a speaker system. To be specific, a first speaker A1 of the screen A and a first speaker C1 of the screen C correspond to a left channel, and a second speaker A2 of the screen A and a second speaker C2 of the screen C correspond to a right channel.

It can be learned that, in this embodiment, when the spliced screen 20 displays different pictures, a speaker system with a center channel may be jointly constructed by using a speaker that does not make a sound, to achieve an effect of playing stereo, thereby improving audio play quality and improving auditory-visual experience of the user.

The foregoing devices implement corresponding functions by using software modules.

Figure 24:
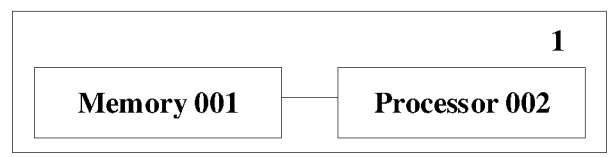
FIG. 24 is a schematic diagram of software modules of a host according to an embodiment of this application.

In an embodiment, as shown in FIG. 24, an apparatus for allocating spliced screen audio for implementing functions of behaviors of the host 1 includes: a memory 001 and a processor 002. The memory 001 is coupled to the processor 002. The memory 001 is configured to store computer program code/instructions.

The processor 002 is configured to: obtain screen parameters of the at least two screens, where the screen parameters include relative locations of the at least two screens and speaker information of the at least two screens, and the speaker information includes a quantity and locations of speakers;

obtain video source information of the at least two screens, where the video source information includes a first video source corresponding to the first screen and the second screen, and the first video source includes corresponding first audio data;

construct a first speaker system based on the video source information, where the first speaker system includes a speaker of the first screen and a speaker of the second screen; and allocate corresponding channel types to the speakers in the first speaker system based on the screen parameters, where the channel types include a left channel, a center channel, and a right channel.

In an implementation, the at least two screens further include a third screen, and the video source information further includes a second video source that the third screen corresponds to; and the processor 002 is further configured to: before constructing the first speaker system based on the video source information, determine whether the first video source and the second video source are a same video source; and if the first video source and the second video source are a same video source, the processor 002 is further configured to construct the first speaker system based on the video source information, where the first speaker system includes the speaker of the first screen, the speaker of the second screen, and a speaker of the third screen.

In an implementation, the at least two screens further include a third screen, and the video source information further includes a second video source that the third screen corresponds to;

the processor 002 is further configured to: before constructing the first speaker system based on the video source information, determine whether the first video source and the second video source are a same video source;

if the first video source and the second video source are different video sources, determine whether the second video source includes audio data; and if the second video source carries the audio data, obtain a first indication of a user; and the processor 002 is further configured to construct the first speaker system based on the first indication and the video source information.

In an implementation, the first indication indicates to play the audio data carried in the first video source, or indicates to play the first audio data; and the processor 002 is further configured to construct the first speaker system by using the speaker of the first screen and the speaker of the second screen based on the first indication and the video source information.

In an implementation, the at least two screens further include a third screen, and the video source information further includes a second video source that the third screen corresponds to;

the processor 002 is further configured to: before constructing the first speaker system based on the video source information, determine whether the first video source and the second video source are a same video source;

if the first video source and the second video source are different video sources, determine whether the second video source carries audio data; and if the second video source has no audio data, the processor 002 is further configured to construct the first speaker system based on the video source information, where the first speaker system includes the speaker of the first screen, the speaker of the second screen, and a speaker of the third screen.

In an implementation, the at least two screens further include a third screen and a fourth screen, the video source information further includes a second video source that the third screen corresponds to and a third video source that the fourth screen corresponds to;

the processor 002 is further configured to: before constructing the first speaker system based on the video source information, determine whether the first video source, the second video source, and the third video source are a same video source;

if the first video source, the second video source, and the third video source correspond to at least two video sources, determine whether the second video source and the third video source carry audio data; and if the second video source or the third video source carries audio data, obtain a second indication of a user; and the processor 002 is further configured to construct the first speaker system based on the second indication, the video source information, and a preset rule.

In an implementation, the preset rule includes that the speakers in the first speaker system are symmetrically disposed.

In an implementation, based on the screen parameters, the processor 002 is further configured to: allocate a left channel to a speaker on a left side of a second combined screen, allocate a center channel to a speaker in a middle of the second combined screen, and allocate a right channel to a speaker on a right side of the second combined screen, where the second combined screen includes the screens corresponding to the speakers in the first speaker system.

In an implementation, the speaker information further includes speaker numbers, and after allocating the corresponding channel types to the speakers in the first speaker system based on the screen parameters, the processor 002 is further configured to:

generate a channel allocation instruction based on an allocation result of the channel types, where the channel allocation instruction includes a correspondence between the allocation result of the channel types and the speaker numbers.

In an implementation, after allocating the corresponding channel types to the speakers in the first speaker system based on the screen parameters, the processor 002 is further configured to:

construct a first receiving group by using the screens corresponding to the speakers in the first speaker system, where the first receiving group has a first multicast address; and send audio data and an allocation result of the channel types to the first multicast address.

In an implementation, the processor 002 is further configured to allocate video data to the screens in the first combined screen based on the video source information and the relative locations of the at least two screens.

In an implementation, the screen parameters further include screen numbers of the at least two screens, and the processor 002 is further configured to: generate a picture allocation instruction based on an allocation result of the video data, where the picture allocation instruction includes a correspondence between the screen numbers of the screens and the allocation result of the video data; and send the video data and the picture allocation instruction to the first screen and the second screen.

This application further provides a computer storage medium. The computer storage medium stores computer instructions. When the computer instructions are run on a storage device, the storage device is enabled to perform the method in the first aspect and the implementations of the first aspect.

This application further provides a computer program product including instructions. When the computer program product is run on a computer, the computer is enabled to perform the method in the first aspect and the implementations of the first aspect.

This application further provides a chip system. The chip system includes a processor, configured to support the foregoing apparatus or device in implementing functions in the foregoing aspects, for example, generating or processing information in the foregoing methods. In a possible design, the chip system further includes a memory, configured to store program instructions and data that are necessary for the foregoing apparatus or device. The chip system may include a chip, or include a chip and other discrete devices.

The objectives, technical solutions, and beneficial effects of the present invention are further described in detail in the foregoing specific implementations. It should be understood that the foregoing descriptions are merely specific implementations of the present invention, but are not intended to limit the protection scope of the present invention. Any modification, equivalent replacement, or improvement made based on the technical solutions of the present invention shall fall within the protection scope of the present invention.

What is claimed is:

1. A method, comprising:
    obtaining, by a host, screen parameters of at least two screens that are spliced to provide a first combined screen, wherein the screen parameters comprise relative locations of the at least two screens and speaker information of the at least two screens, the speaker information comprises a quantity and locations of speakers of the at least two screens, and wherein the host is configured to control the first combined screen, and the at least two screens comprise a first screen and a second screen;
    obtaining, by the host, video source information of the at least two screens, wherein the video source information comprises a first video source corresponding to the first screen and the second screen, and the first video source comprises corresponding first audio data of the first screen and second screen;
    constructing, by the host, a first speaker system based on the video source information, wherein the first speaker system comprises a speaker of the first screen and a speaker of the second screen; and
    allocating corresponding channel types to speakers in the first speaker system based on the screen parameters, wherein the channel types comprise a left channel, a center channel, and a right channel.

2. The method according to claim 1, wherein the at least two screens further comprise a third screen, the video source information further comprises a second video source that the third screen corresponds to, and before constructing the first speaker system based on the video source information, the method further comprises:
    determining whether the first video source and the second video source are a same video source, wherein in response to the first video source and the second video source being a same video source, constructing the first speaker system based on the video source information comprises including a speaker of the third screen in the first speaker system.

3. The method according to claim 1, wherein the at least two screens further comprise a third screen, the video source information further comprises a second video source that the third screen corresponds to, and before constructing the first speaker system based on the video source information, the method further comprises:
    determining whether the first video source and the second video source are a same video source;
    in response to the first video source and the second video source being different video sources, determining whether the second video source comprises audio data; and
    in response to the second video source having the audio data, obtaining a first indication of a user, wherein constructing the first speaker system based on the video source information comprises constructing the first speaker system based on the first indication and the video source information.

4. The method according to claim 1, wherein the at least two screens further comprise a third screen, the video source information further comprises a second video source that the third screen corresponds to, and before constructing the first speaker system based on the video source information, the method further comprises:
    determining whether the first video source and the second video source are a same video source; and
    in response to the first video source and the second video source being different video sources, determining whether the second video source carries audio data, wherein in response to the second video source having no audio data, constructing the first speaker system based on the video source information comprises including a speaker of the third screen in the first speaker system.

5. The method according to claim 1, wherein the at least two screens further comprise a third screen and a fourth screen, the video source information further comprises a second video source that the third screen corresponds to and a third video source that the fourth screen corresponds to, and before constructing the first speaker system based on the video source information, the method further comprises:
    determining whether the first video source, the second video source, and the third video source are a same video source;
    in response to the first video source, the second video source, and the third video source corresponding to at least two video sources, determining whether the second video source and the third video source carry audio data; and
    in response to the second video source or the third video source carrying audio data, obtaining a second indication of a user, wherein constructing the first speaker system based on the video source information comprises: constructing the first speaker system based on the second indication, the video source information, and a preset rule.

6. The method according to claim 1, wherein allocating corresponding channel types to the speakers in the first speaker system based on the screen parameters comprises:
    allocating the left channel to a speaker on a left side of a second combined screen, allocating the center channel to a speaker in a middle of the second combined screen, and allocating the right channel to a speaker on a right side of the second combined screen, wherein the second combined screen comprises screens corresponding to the speakers in the first speaker system.

7. The method according to claim 1, wherein the speaker information further comprises speaker numbers, and after allocating corresponding channel types to the speakers in the first speaker system based on the screen parameters, the method further comprises:
    generating a channel allocation instruction based on an allocation result of the channel types, wherein the channel allocation instruction comprises a correspondence between the allocation result of the channel types and the speaker numbers.

8. The method according to claim 1, wherein after allocating corresponding channel types to the speakers in the first speaker system based on the screen parameters, the method further comprises:
    constructing a first receiving group from screens corresponding to the speakers in the first speaker system, wherein the first receiving group has a first multicast address; and sending audio data and an allocation result of the channel types to the first multicast address.

9. The method according to claim 1, wherein the method further comprises:
allocating video data to screens in the first combined screen based on the video source information and the relative locations of the at least two screens; and
generating a picture allocation instruction based on an allocation result of the video data, wherein the picture allocation instruction comprises a correspondence between the screens in the first combined screen and the video data.

10. The method according to claim 9, wherein the method further comprises:
constructing a second receiving group from screens corresponding to a same video source, wherein the second receiving group has a second multicast address; and
sending the video data and the picture allocation instruction to the second multicast address.

11. The method according to claim 3, wherein the first indication indicates to play the audio data carried in the first video source or indicates to play the first audio data; and constructing the first speaker system based on the video source information comprises:
constructing the first speaker system using the speaker of the first screen and the speaker of the second screen based on the first indication and the video source information.

12. The method according to claim 5, wherein the preset rule comprises that the speakers in the first speaker system are symmetrically disposed.

13. A system, comprising:
a first combined screen comprising at least two screens that are spliced, and the at least two screens comprise a first screen and a second screen; and
a host configured to control the first combined screen, wherein the host is configured to:
obtain screen parameters of the at least two screens, wherein the screen parameters comprise relative locations of the at least two screens and speaker information of the at least two screens, and the speaker information comprises a quantity and locations of speakers of the at least two screens;
obtain video source information of the at least two screens, wherein the video source information comprises a first video source corresponding to the first screen and the second screen, and the first video source comprises corresponding first audio data;
constructing a first speaker system based on the video source information, wherein the first speaker system comprises a speaker of the first screen and a speaker of the second screen; and
sending a channel allocation instruction to the first screen and the second screen based on the screen parameters, wherein the channel allocation instruction allocates corresponding channel types to speakers in the first speaker system, and the channel types comprise a left channel, a center channel, and a right channel, and wherein the first screen and the second screen extract, according to the channel allocation instruction, corresponding audio data from the first audio data for playing at corresponding speakers.

14. The system according to claim 13, wherein:
the first screen and the second screen extract the corresponding channel types from the channel allocation instruction based on speaker numbers;
the first screen and the second screen extract audio data from the first audio data based on the channel types; and
the first screen and the second screen distribute the audio data to the corresponding speakers for playing.

15. The system according to claim 13, wherein the host is further configured to:
allocate video data to the screens in the first combined screen based on the video source information and the relative locations of the at least two screens;
generate a picture allocation instruction based on an allocation result of the video data, wherein the picture allocation instruction comprises a correspondence between the screens and the video data; and
send the video data and the picture allocation instruction to the first screen and the second screen.

16. The system according to claim 15, wherein the first screen and the second screen:
extract corresponding pictures from the picture allocation instruction and the video data based on the screen parameters; and
play the corresponding pictures.

17. An electronic device, comprising a memory and a processor, wherein the memory is coupled to the processor, the memory is configured to store computer program instructions, and when the processor executes the computer program instructions, the electronic device is enabled to perform:
obtaining screen parameters of at least two screens that are spliced to provide a first combined screen, wherein the screen parameters comprise relative locations of the at least two screens and speaker information of the at least two screens, the speaker information comprises a quantity and locations of speakers of the at least two screens, and the at least two screens comprise a first screen and a second screen;
obtaining video source information of the at least two screens, wherein the video source information comprises a first video source corresponding to the first screen and the second screen, and the first video source comprises corresponding first audio data;
constructing a first speaker system based on the video source information, wherein the first speaker system comprises a speaker of the first screen and a speaker of the second screen; and
allocating corresponding channel types to speakers in the first speaker system based on the screen parameters, wherein the channel types comprise a left channel, a center channel, and a right channel.

18. The electronic device according to claim 17, wherein the at least two screens further comprise a third screen, the video source information further comprises a second video source that the third screen corresponds to, and when the processor executes the computer program instructions, the electronic device is further enabled to perform:
determine whether the first video source and the second video source are a same video source; and
in response to the first video source and the second video source being a same video source, including a speaker of the third screen in the first speaker system when constructing the first speaker system.

19. The electronic device according to claim 17, wherein the at least two screens further comprise a third screen, the video source information further comprises a second video source that the third screen corresponds to, and when the processor executes the computer program instructions, the electronic device is further enabled to perform:

determine whether the first video source and the second video source are a same video source;

in response to the first video source and the second video source being different video sources, determine whether the second video source comprises audio data;

in response to the second video source carrying the audio data, obtain a first indication of a user; and construct the first speaker system based on the first indication and the video source information.

20. The electronic device according to claim 19, wherein the first indication indicates to play the audio data carried in the first video source or indicates to play the first audio data, and constructing the first speaker system based on the video source information comprises:

constructing the first speaker system from the speaker of the first screen and the speaker of the second screen based on the first indication and the video source information.

* * * * *